(12) United States Patent
Laverne

(10) Patent No.: US 12,112,504 B2
(45) Date of Patent: Oct. 8, 2024

(54) METHOD, SYSTEM, AND COMPUTER PROGRAM PRODUCT FOR PARALLAX ESTIMATION FOR SENSORS FOR AUTONOMOUS VEHICLES

(71) Applicant: Argo AI, LLC, Pittsburgh, PA (US)

(72) Inventor: Michel Laverne, Pittsburgh, PA (US)

(73) Assignee: Argo AI, LLC, Pittsburgh, PA (US)

( * ) Notice: Subject to any disclaimer, the term of this patent is extended or adjusted under 35 U.S.C. 154(b) by 530 days.

(21) Appl. No.: 17/512,765

(22) Filed: Oct. 28, 2021

(65) Prior Publication Data

US 2023/0132967 A1 May 4, 2023

(51) Int. Cl.
*G06T 7/80* (2017.01)
*B60W 50/14* (2020.01)
(Continued)

(52) U.S. Cl.
CPC .............. *G06T 7/80* (2017.01); *B60W 50/14* (2013.01); *B60W 60/001* (2020.02); *G01S 7/497* (2013.01); *H04N 17/002* (2013.01); *H04N 23/695* (2023.01); *B60W 2050/146* (2013.01); *B60W 2420/403* (2013.01); *B60W 2420/408* (2024.01); *G06T 2207/10028* (2013.01); *G06T 2207/30244* (2013.01); *G06T 2207/30252* (2013.01)

(58) Field of Classification Search
CPC ............. G06T 7/80; G06T 2207/10028; G06T 2207/30244; G06T 2207/30252; B60W 50/14; B60W 60/001; B60W 2050/146; B60W 2420/403; B60W 2420/408; G01S 7/497; G01S 7/4972; G01S 7/4808; G01S 17/86; G01S 17/89; G01S 17/931; H04N 17/002; H04N 23/695; H04N 23/60

USPC .......................................................... 701/3
See application file for complete search history.

(56) References Cited

U.S. PATENT DOCUMENTS 5,964,822 A * 10/1999 Alland .................... G01S 15/42
701/96
9,201,424 B1 * 12/2015 Ogale .................. G05D 1/0253
(Continued)

FOREIGN PATENT DOCUMENTS

WO 2021116078 A1 6/2021

OTHER PUBLICATIONS

Chien et al., "Bundle Adjustment with Implicit Structure Modeling Using a Direct Linear Transform", Sep. 2015, 13 pages.

*Primary Examiner* — Muhammad Shafi
(74) *Attorney, Agent, or Firm* — The Webb Law Firm

(57) ABSTRACT

Methods, systems, and products for parallax estimation for sensors for autonomous vehicles may include generating a two-dimensional grid based on a field of view of a first sensor. For each respective point in the grid, a three-dimensional position of an intersection point between a first ray from the first sensor and a second ray from a second sensor may be determined. For each respective intersection point, a respective solid angle may be determined based on a first three-dimensional vector from the first sensor and a second three-dimensional vector from the second sensor to the intersection point. A matrix may be generated based on a distance from the first sensor, a distance from the second sensor, and the solid angle for each respective intersection point. At least one metric may be extracted from the matrix. An arrangement of the first and second sensors may be adjusted based on the metric(s).

18 Claims, 9 Drawing Sheets

(51) Int. Cl.
   *B60W 60/00*   (2020.01)
   *G01S 7/497*   (2006.01)
   *H04N 17/00*   (2006.01)
   *H04N 23/695*  (2023.01)

(56) References Cited

U.S. PATENT DOCUMENTS

| | | |
|---|---|---|
| 10,430,971 B2 | 10/2019 | Ueno et al. |
| 2006/0125921 A1* | 6/2006 | Foote ........................ G06T 7/33 |
| | | 348/E5.055 |
| 2012/0293634 A1* | 11/2012 | Ishii ....................... H04N 13/20 |
| | | 348/E13.074 |
| 2019/0156503 A1* | 5/2019 | Furihata ................. G06T 7/593 |
| 2021/0042951 A1* | 2/2021 | Steinmeyer .......... H04N 13/246 |
| 2023/0132967 A1* | 5/2023 | Laverne .................... G06T 7/80 |
| | | 356/6 |

* cited by examiner

METHOD, SYSTEM, AND COMPUTER PROGRAM PRODUCT FOR PARALLAX ESTIMATION FOR SENSORS FOR AUTONOMOUS VEHICLES

BACKGROUND

1. Field

This disclosed subject matter relates generally to methods, systems, and products for parallax estimation between sensors and, in some particular embodiments or aspects, to a method, system, and computer program product for parallax estimation for sensors (e.g., camera and LiDAR) for autonomous vehicles.

2. Technical Considerations

Object detection (and, more generally, automated perception algorithms) rely on inputs from sensors. For example, autonomous vehicles, robotics, and/or the like may rely on multiple (potentially heterogeneous) sensors looking at the same point in the world to infer information about the environment or objects therein.

However, because sensors have size (e.g., volume) and/or other physical limitations, it may not be possible for two or more sensors to be collocated in the same or substantially similar position and/or orientation. For example, two sensors that are placed side-by-side may have some distance between them due to their physical size. Additionally or alternatively, it may be desirable to place sensors in different areas of an autonomous vehicle, such as the roof of the vehicle for some sensors and the front or rear end of the vehicle for other sensors. This inability to collocate sensors can result in parallax. In some situations, parallax may be beneficial or desirable (e.g., for calculating stereo disparity between images from two cameras in multi-view computer vision). However, in many other situations, parallax may be undesirable, as different sensors may detect the same object from vantage points that are different enough that matching or fusing the object and/or data associated therewith may be challenging. For example, two different types of sensors may each detect the same object, but the vantage points of such sensors may be different enough that the system (e.g., an autonomous vehicle) cannot determine that the detections from the different sensors are actually the same object. As such, it may be desirable to reduce parallax, but such reduction may be difficult because of challenges in quantifying parallax. For example, two-dimensional and/or graphic-based techniques for estimating parallax may not adequately be used to quantify parallax in a three-dimensional environment. Additionally, such techniques may not completely or adequately explore the tradespace (e.g., the tradeoffs of different arrangements in a playspace of arrangements). Moreover, such techniques may rely on manual inputs from engineers.

As such, there is a need for an improved technique to estimate (e.g., quantify) parallax in order to evaluate and/or select sensor placement (e.g., for autonomous vehicles, to reduce parallax and therefore facilitate autonomous driving operations based on data from such sensors).

SUMMARY

Accordingly, it is an object of the presently disclosed subject matter to provide methods, systems, and computer program products for parallax estimation for sensors (e.g., camera and LiDAR) for autonomous vehicles, that overcome some or all of the deficiencies identified above.

According to non-limiting embodiments or aspects, provided is a method for parallax estimation for sensors (e.g., camera and LiDAR) for autonomous vehicles. In some non-limiting embodiments or aspects, a method for parallax estimation for sensors (e.g., camera and LiDAR) for autonomous vehicles may include generating a two-dimensional grid based on a field of view of a first sensor of an autonomous vehicle, and the grid may include a plurality of points. For each respective point of the plurality of points, a three-dimensional position of a respective intersection point between a first respective ray from the first sensor to the respective point of the plurality of points and a second respective ray from a second sensor of the autonomous vehicle may be determined, and a plurality of intersection points may include each respective intersection point for each respective point of the plurality of points. For each respective intersection point of the plurality of intersection points, a respective solid angle may be determined based on a first three-dimensional vector from the first sensor to the three-dimensional position of the respective intersection point and a second three-dimensional vector from the second sensor to the three-dimensional position of the respective intersection point. A matrix may be generated based on a first distance from the first sensor to each respective intersection point, a second distance from the second sensor to each respective intersection point, and the solid angle for each respective intersection point. At least one metric may be extracted from the matrix. An arrangement of the first sensor and the second sensor may be adjusted based on the at least one metric.

In some non-limiting embodiments or aspects, the first sensor may include an image capture system and the second sensor may include a ray casting system.

In some non-limiting embodiments or aspects, the image capture system may include a camera and the ray casting system may include a LiDAR.

In some non-limiting embodiments or aspects, first sensor parameters for the first sensor, first position data associated with a first position of the first sensor, first orientation data associated with a first orientation of the first sensor, second sensor parameters for the second sensor, second position data associated with a second position of the second sensor, and second orientation data associated with a second orientation of the second sensor may be received. The first sensor parameters may include the field of view of the first sensor. The second sensor parameters may include ray data associated with a plurality of rays cast by the second sensor. Adjusting the arrangement may include adjusting at least one of the first position of the first sensor, the first orientation of the first sensor, the second position of the second sensor, the second orientation of the second sensor, or any combination thereof.

In some non-limiting embodiments or aspects, generating the two-dimensional grid may include generating a plurality of horizontal lines across the field of view and/or generating a plurality of vertical lines across the field of view. Each respective intersection between a respective horizontal line of the plurality of horizontal lines and a respective vertical line of the plurality of vertical lines may include a respective point of the plurality of points.

In some non-limiting embodiments or aspects, the first respective ray from the first sensor to each respective point of the plurality of points may be determined based on an azimuth and an elevation for each respective point with respect to the first sensor.

In some non-limiting embodiments or aspects, the first sensor may include a camera and the azimuth and the elevation for each respective point are with respect to a center of a lens of the camera.

In some non-limiting embodiments or aspects, the second respective ray may include a worst-case ray of a plurality of rays cast by the second sensor.

In some non-limiting embodiments or aspects, the second sensor may include a LiDAR, and the worst-case ray may include a lowest beam having a lowest elevation if the LiDAR is positioned above the first sensor or a highest beam having a highest elevation if the LiDAR is positioned below the first sensor.

In some non-limiting embodiments or aspects, boundary data associated with at least one boundary condition may be received. A first intersection point of the plurality of intersection points may be determined to not satisfy the at least one boundary condition. The first intersection point may be replaced with a replacement intersection point between the first respective ray from the first sensor and a lowest remaining beam having a lowest remaining elevation if the LiDAR is positioned above the first sensor or a highest remaining beam having a highest remaining elevation if the LiDAR is positioned below the first sensor, and the replacement intersection point may satisfy the at least one boundary condition.

In some non-limiting embodiments or aspects, the at least one boundary condition may include at least one of a first minimum range for the first sensor, a second minimum range for the second sensor, a first maximum range for the first sensor, a second maximum range for the second sensor, a ground surface position of a ground surface upon which the autonomous vehicle is located, or any combination thereof.

In some non-limiting embodiments or aspects, the first three-dimensional vector may be generated based on the three-dimensional position of the respective intersection point and a first three-dimensional position of the first sensor. The second three-dimensional vector may be generated based on the three-dimensional position of the respective intersection point and a second three-dimensional position of the second sensor.

In some non-limiting embodiments or aspects, determining the respective solid angle may include generating a first unit vector based on the first three-dimensional vector, generating a second unit vector based on the second three-dimensional vector, and calculating the solid angle based on the first unit vector and the second unit vector.

In some non-limiting embodiments or aspects, generating the matrix may include generating a 3×n matrix, wherein n is a number of intersection points of the plurality of intersection points. Each respective column of the 3×n matrix may be populated with the first distance from the first sensor to the respective intersection point, the second distance from the second sensor to the respective intersection point, and the solid angle for the respective intersection point.

In some non-limiting embodiments or aspects, extracting the at least one metric from the matrix may include at least one of determining a minimum solid angle based on the matrix, determining a maximum solid angle based on the matrix, determining a minimum range of solid angles based on the matrix, determining a maximum range of solid angles based on the matrix, determining a spread of solid angles based on the matrix, determining an average of solid angles based on the matrix, determining a standard deviation of solid angles based on the matrix, determining a three-sigma range of solid angles based on the matrix, determining a minimum first distance based on the matrix, determining a maximum first distance based on the matrix, determining a minimum range of first distances based on the matrix, determining a maximum range of first distances based on the matrix, determining a spread of first distances based on the matrix, determining an average of first distances based on the matrix, determining a standard deviation of first distances based on the matrix, determining a three-sigma range of first distances based on the matrix, determining a minimum second distance based on the matrix, determining a maximum second distance based on the matrix, determining a minimum range of second distances based on the matrix, determining a maximum range of second distances based on the matrix, determining a spread of second distances based on the matrix, determining an average of second distances based on the matrix, determining a standard deviation of second distances based on the matrix, determining a three-sigma range of second distances based on the matrix, or any combination thereof.

In some non-limiting embodiments or aspects, the two-dimensional grid may be interpolated based on the at least one metric. A visual representation may be displayed based on interpolating the two-dimensional grid.

In some non-limiting embodiments or aspects, displaying the visual representation may include displaying a gradient of at least one of shades or colors based on the at least one metric across a two-dimensional image.

In some non-limiting embodiments or aspects, potential arrangement data associated with a plurality of potential arrangements of the first sensor and the second sensor may be received. The plurality of potential arrangements may include a first potential arrangement and a second potential arrangement. The first sensor and the second sensor may be initially in the first potential arrangement. Adjusting the arrangement may include adjusting the arrangement from the first potential arrangement to the second potential arrangement based on the at least one metric satisfying a threshold and repeating generating of the two-dimensional grid, determining of the three-dimensional position of the respective intersection point for each respective point of the plurality of points, determining the respective solid angle for each respective intersection point, generating the matrix, and extracting the at least one metric from the matrix based on the first sensor and the second sensor being in the second potential arrangement.

According to non-limiting embodiments or aspects, provided is a system for parallax estimation for sensors (e.g., camera and LiDAR) for autonomous vehicles. In some non-limiting embodiments or aspects, a system for parallax estimation for sensors (e.g., camera and LiDAR) for autonomous vehicles may include an autonomous vehicle, a first sensor of the autonomous vehicle, a second sensor of the autonomous vehicle, and a parallax estimation and sensor placement system. The parallax estimation and sensor placement system may be configured to generate a two-dimensional grid based on a field of view of the first sensor of the autonomous vehicle, and the grid may include a plurality of points. For each respective point of the plurality of points, the parallax estimation and sensor placement system may be configured to determine a three-dimensional position of a respective intersection point between a first respective ray from the first sensor to the respective point of the plurality of points and a second respective ray from the second sensor of the autonomous vehicle, and a plurality of intersection points may include each respective intersection point for each respective point of the plurality of points. For each respective intersection point of the plurality of intersection points, the parallax estimation and sensor placement system may be configured to determine a respective solid angle based on a first three-dimensional vector from the first sensor to the three-dimensional position of the respective intersection point and a second three-dimensional vector from the second sensor to the three-dimensional position of the respective intersection point. The parallax estimation and sensor placement system may be configured to generate a matrix based on a first distance from the first sensor to each respective intersection point, a second distance from the second sensor to each respective intersection point, and the solid angle for each respective intersection point. The parallax estimation and sensor placement system may be configured to extract at least one metric from the matrix. An arrangement of the first sensor and the second sensor may be adjusted based on the at least one metric. Additionally or alternatively, the parallax estimation and sensor placement system may be configured to perform any of the methods described herein.

According to non-limiting embodiments or aspects, provided is a computer program product for parallax estimation for sensors (e.g., camera and LiDAR) for autonomous vehicles. In some non-limiting embodiments or aspects, a computer program product may include at least one non-transitory computer-readable medium comprising one or more instructions that, when executed by at least one processor, cause the at least one processor to generate a two-dimensional grid based on a field of view of the first sensor of the autonomous vehicle, the grid comprising a plurality of points; for each respective point of the plurality of points, determine a three-dimensional position of a respective intersection point between a first respective ray from the first sensor to the respective point of the plurality of points and a second respective ray from the second sensor of the autonomous vehicle, wherein a plurality of intersection points may include each respective intersection point for each respective point of the plurality of points; for each respective intersection point of the plurality of intersection points, determine a respective solid angle based on a first three-dimensional vector from the first sensor to the three-dimensional position of the respective intersection point and a second three-dimensional vector from the second sensor to the three-dimensional position of the respective intersection point; generate a matrix based on a first distance from the first sensor to each respective intersection point, a second distance from the second sensor to each respective intersection point, and the solid angle for each respective intersection point; and extract at least one metric from the matrix. An arrangement of the first sensor and the second sensor is adjusted based on the at least one metric. Additionally or alternatively, the instruction(s), when executed by the processor(s), may cause the processor(s) to perform any of the methods described herein.

Further embodiments or aspects are set forth in the following numbered clauses:

Clause 1: A method for parallax estimation for sensors for autonomous vehicles, comprising: generating a two-dimensional grid based on a field of view of a first sensor of an autonomous vehicle, the grid comprising a plurality of points; for each respective point of the plurality of points, determining a three-dimensional position of a respective intersection point between a first respective ray from the first sensor to the respective point of the plurality of points and a second respective ray from a second sensor of the autonomous vehicle, wherein a plurality of intersection points comprises each respective intersection point for each respective point of the plurality of points; for each respective intersection point of the plurality of intersection points, determining a respective solid angle based on a first three-dimensional vector from the first sensor to the three-dimensional position of the respective intersection point and a second three-dimensional vector from the second sensor to the three-dimensional position of the respective intersection point; generating a matrix based on a first distance from the first sensor to each respective intersection point, a second distance from the second sensor to each respective intersection point, and the solid angle for each respective intersection point; extracting at least one metric from the matrix; and adjusting an arrangement of the first sensor and the second sensor based on the at least one metric.

Clause 2: The method of clause 1, wherein the first sensor comprises an image capture system and the second sensor comprises a ray casting system.

Clause 3: The method of any preceding clause, wherein the image capture system comprises a camera and the ray casting system comprises a LiDAR.

Clause 4: The method of any preceding clause, further comprising receiving first sensor parameters for the first sensor, first position data associated with a first position of the first sensor, first orientation data associated with a first orientation of the first sensor, second sensor parameters for the second sensor, second position data associated with a second position of the second sensor, and second orientation data associated with a second orientation of the second sensor, wherein the first sensor parameters comprise the field of view of the first sensor, wherein the second sensor parameters comprise ray data associated with a plurality of rays cast by the second sensor, and wherein adjusting the arrangement comprises adjusting at least one of the first position of the first sensor, the first orientation of the first sensor, the second position of the second sensor, the second orientation of the second sensor, or any combination thereof.

Clause 5: The method of any preceding clause, wherein generating the two-dimensional grid comprises: generating a plurality of horizontal lines across the field of view; and generating a plurality of vertical lines across the field of view, wherein each respective intersection between a respective horizontal line of the plurality of horizontal lines and a respective vertical line of the plurality of vertical lines comprises a respective point of the plurality of points.

Clause 6: The method of any preceding clause, further comprising determining the first respective ray from the first sensor to each respective point of the plurality of points based on an azimuth and an elevation for each respective point with respect to the first sensor.

Clause 7: The method of any preceding clause, wherein the first sensor comprises a camera and the azimuth and the elevation for each respective point are with respect to a center of a lens of the camera.

Clause 8: The method of any preceding clause, wherein the second respective ray comprises a worst-case ray of a plurality of rays cast by the second sensor.

Clause 9: The method of any preceding clause, wherein the second sensor comprises a LiDAR, and wherein the worst-case ray comprises a lowest beam having a lowest elevation if the LiDAR is positioned above the first sensor or a highest beam having a highest elevation if the LiDAR is positioned below the first sensor.

Clause 10: The method of any preceding clause, further comprising: receiving boundary data associated with at least one boundary condition; determining that a first intersection point of the plurality of intersection points does not satisfy the at least one boundary condition; and replacing the first intersection point with a replacement intersection point between the first respective ray from the first sensor and a lowest remaining beam having a lowest remaining elevation if the LiDAR is positioned above the first sensor or a highest remaining beam having a highest remaining elevation if the LiDAR is positioned below the first sensor, wherein the replacement intersection point does satisfy the at least one boundary condition.

Clause 11: The method of any preceding clause, wherein the at least one boundary condition comprises at least one of a first minimum range for the first sensor, a second minimum range for the second sensor, a first maximum range for the first sensor, a second maximum range for the second sensor, a ground surface position of a ground surface upon which the autonomous vehicle is located, or any combination thereof.

Clause 12: The method of any preceding clause, further comprising: generating the first three-dimensional vector based on the three-dimensional position of the respective intersection point and a first three-dimensional position of the first sensor; and generating the second three-dimensional vector based on the three-dimensional position of the respective intersection point and a second three-dimensional position of the second sensor.

Clause 13: The method of any preceding clause, wherein determining the respective solid angle comprises: generating a first unit vector based on the first three-dimensional vector; generating a second unit vector based on the second three-dimensional vector; and calculating the solid angle based on the first unit vector and the second unit vector.

Clause 14: The method of any preceding clause, wherein generating the matrix comprises: generating a 3×n matrix, wherein n is a number of intersection points of the plurality of intersection points; populating each respective column of the 3×n matrix with the first distance from the first sensor to the respective intersection point, the second distance from the second sensor to the respective intersection point, and the solid angle for the respective intersection point.

Clause 15: The method of any preceding clause, wherein extracting the at least one metric from the matrix comprises at least one of: determining a minimum solid angle based on the matrix; determining a maximum solid angle based on the matrix; determining a minimum range of solid angles based on the matrix; determining a maximum range of solid angles based on the matrix; determining a spread of solid angles based on the matrix; determining an average of solid angles based on the matrix; determining a standard deviation of solid angles based on the matrix; determining a three-sigma range of solid angles based on the matrix; determining a minimum first distance based on the matrix; determining a maximum first distance based on the matrix; determining a minimum range of first distances based on the matrix; determining a maximum range of first distances based on the matrix; determining a spread of first distances based on the matrix; determining an average of first distances based on the matrix; determining a standard deviation of first distances based on the matrix; determining a three-sigma range of first distances based on the matrix; determining a minimum second distance based on the matrix; determining a maximum second distance based on the matrix; determining a minimum range of second distances based on the matrix; determining a maximum range of second distances based on the matrix; determining a spread of second distances based on the matrix; determining an average of second distances based on the matrix; determining a standard deviation of second distances based on the matrix; determining a three-sigma range of second distances based on the matrix; or any combination thereof.

Clause 16: The method of any preceding clause, further comprising: interpolating the two-dimensional grid based on the at least one metric; and displaying a visual representation based on interpolating the two-dimensional grid.

Clause 17: The method of any preceding clause, wherein displaying the visual representation comprises displaying a gradient of at least one of shades or colors based on the at least one metric across a two-dimensional image.

Clause 18: The method of any preceding clause, further comprising: receiving potential arrangement data associated with a plurality of potential arrangements of the first sensor and the second sensor, the plurality of potential arrangements comprising a first potential arrangement and a second potential arrangement, wherein the first sensor and the second sensor are initially in the first potential arrangement, and wherein adjusting the arrangement comprises: adjusting the arrangement from the first potential arrangement to the second potential arrangement based on the at least one metric satisfying a threshold; and repeating generating of the two-dimensional grid, determining of the three-dimensional position of the respective intersection point for each respective point of the plurality of points, determining the respective solid angle for each respective intersection point, generating the matrix, and extracting the at least one metric from the matrix based on the first sensor and the second sensor being in the second potential arrangement.

Clause 19. A system for parallax estimation for sensors for autonomous vehicles, comprising: an autonomous vehicle; a first sensor of the autonomous vehicle; a second sensor of the autonomous vehicle; and a parallax estimation and sensor placement system configured to: generate a two-dimensional grid based on a field of view of the first sensor of the autonomous vehicle, the grid comprising a plurality of points; for each respective point of the plurality of points, determine a three-dimensional position of a respective intersection point between a first respective ray from the first sensor to the respective point of the plurality of points and a second respective ray from the second sensor of the autonomous vehicle, wherein a plurality of intersection points comprises each respective intersection point for each respective point of the plurality of points; for each respective intersection point of the plurality of intersection points, determine a respective solid angle based on a first three-dimensional vector from the first sensor to the three-dimensional position of the respective intersection point and a second three-dimensional vector from the second sensor to the three-dimensional position of the respective intersection point; generate a matrix based on a first distance from the first sensor to each respective intersection point, a second distance from the second sensor to each respective intersection point, and the solid angle for each respective intersection point; and extract at least one metric from the matrix, wherein an arrangement of the first sensor and the second sensor is adjusted based on the at least one metric.

Clause 20. A computer program product for parallax estimation for a first sensor and a second sensor of an autonomous vehicle, the computer program product comprising at least one non-transitory computer-readable medium comprising one or more instructions that, when executed by at least one processor, cause the at least one processor to: generate a two-dimensional grid based on a field of view of the first sensor of the autonomous vehicle, the grid comprising a plurality of points; for each respective point of the plurality of points, determine a three-dimensional position of a respective intersection point between a first respective ray from the first sensor to the respective point of the plurality of points and a second respective ray from the second sensor of the autonomous vehicle, wherein a plurality of intersection points comprises each a respective intersection point for each respective point of the plurality of points; for each respective intersection point of the plurality of intersection points, determine a respective solid angle based on a first three-dimensional vector from the first sensor to the three-dimensional position of the respective intersection point and a second three-dimensional vector from the second sensor to the three-dimensional position of the respective intersection point; generate a matrix based on a first distance from the first sensor to each respective intersection point, a second distance from the second sensor to each respective intersection point, and the solid angle for each respective intersection point; and extract at least one metric from the matrix, wherein an arrangement of the first sensor and the second sensor is adjusted based on the at least one metric.

These and other features and characteristics of the presently disclosed subject matter, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter. As used in the specification and the claims, the singular forms of "a," "an," and "the" include plural referents unless the context clearly dictates otherwise.

BRIEF DESCRIPTION OF THE DRAWINGS

Additional advantages and details of the disclosed subject matter are explained in greater detail below with reference to the exemplary embodiments or aspects that are illustrated in the accompanying figures, in which.

DESCRIPTION

Figure 1:
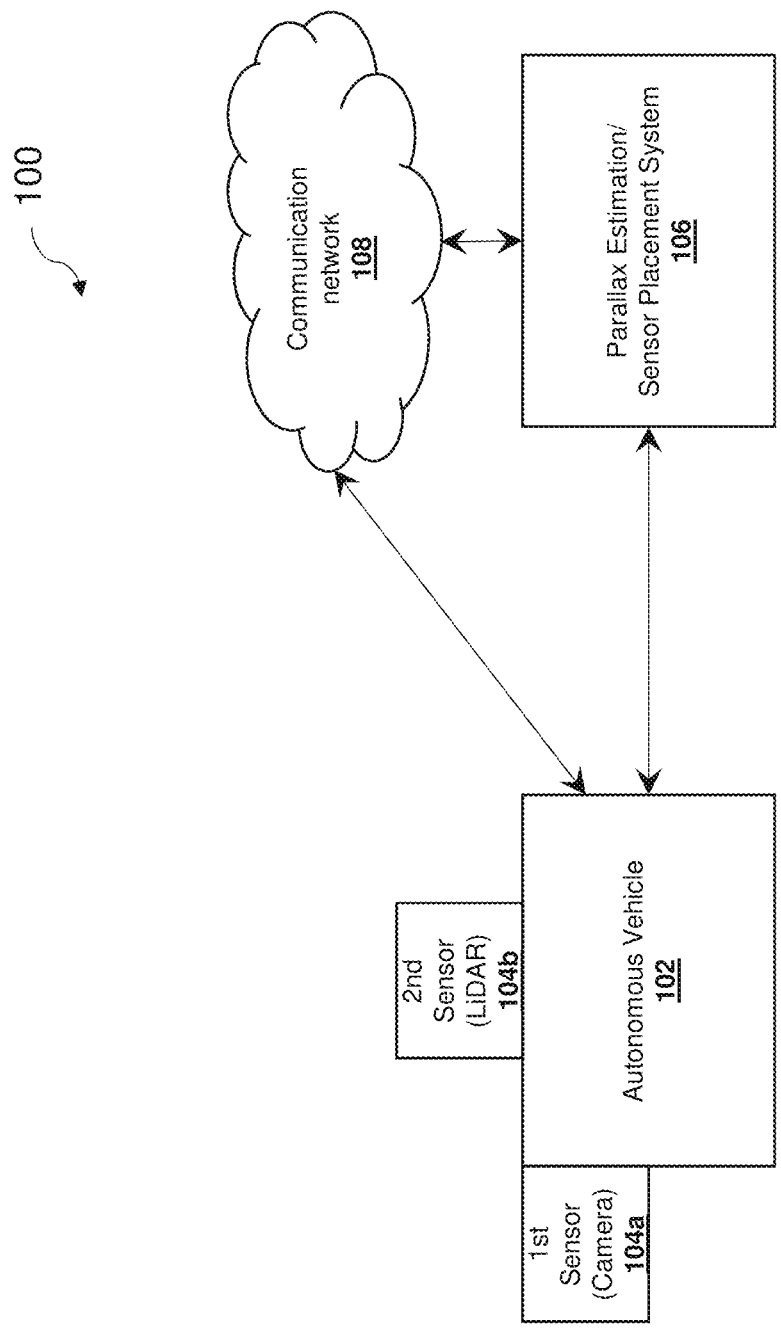
FIG. 1 is a diagram of a non-limiting embodiment or aspect of an environment in which methods, systems, and/or computer program products, described herein, may be implemented according to the principles of the presently disclosed subject matter.

For purposes of the description hereinafter, the terms "end," "upper," "lower," "right," "left," "vertical," "horizontal," "top," "bottom," "lateral," "longitudinal," and derivatives thereof shall relate to the disclosed subject matter as it is oriented in the drawing figures. However, it is to be understood that the disclosed subject matter may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions, and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the term "server" may refer to one or more computing devices (e.g., processors, storage devices, similar computer components, and/or the like) that communicate with client devices and/or other computing devices over a network (e.g., a public network, the Internet, a private network, and/or the like) and, in some examples, facilitate communication among other servers and/or client devices. It will be appreciated that various other arrangements are possible. As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

As used herein, the term "user interface" or "graphical user interface" may refer to a generated display, such as one or more graphical user interfaces (GUIs) with which a user may interact, either directly or indirectly (e.g., through a keyboard, mouse, touchscreen, etc.).

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Non-limiting embodiments or aspects of the disclosed subject matter are directed to systems, methods, and computer program products for parallax estimation for sensors (e.g., camera and LiDAR) for autonomous vehicles. For example, non-limiting embodiments or aspects of the disclosed subject matter provide generating a grid on a field of view of a first sensor (e.g., camera), determining intersections between rays from the first sensor to point in the grid and rays from a second sensor (e.g., LiDAR), determining a solid angle based on three-dimensional vectors from each sensor to each intersection point, and generating a matrix based thereon so that metrics associated with parallax can be extracted from the matrix and used to adjust the arrangement of the sensors. Such embodiments or aspects provide techniques and systems that provide accurate metrics indicative of parallax across a three-dimensional space so that potential sensor arrangements can be evaluated and compared. As such, in situations in which reduced parallax is desirable such as heterogeneous sensors deployed on an autonomous vehicle, sensor arrangements can be selected to reduce parallax and therefore facilitate autonomous driving operations based on data from such sensors. Additionally or alternatively, in situations in which increased parallax is desirable such as multi-view computer vision, sensor (e.g., camera) arrangements can be selected to increase parallax. Moreover, the disclosed embodiments or aspects provide techniques and systems that allow for evaluating sensor arrangements to reduce parallax between sensors (e.g., for an autonomous vehicle), and therefore, allow for different sensors that detect the same object from different vantage points to match the object and/or data associated therewith (e.g., because parallax is reduced, the distance, angle, and/or three-dimensional vector to the object may be sufficiently close when measured from each of the different sensors that matching within a tolerance may occur such that the object is correctly identified as the same object as detected from each sensor). Furthermore, the disclosed embodiments or aspects provide techniques and systems that enable accurate estimation of parallax (e.g., quantification of metrics indicative of parallax) in three-dimensional space. In addition, the disclosed embodiments or aspects provide techniques and systems that enable automated estimation of parallax for multiple different potential arrangements of sensors, thus allowing for the tradespace to be adequately explored in order to identify a desirable (e.g., most desirable, optimal, and/or the like) selection of the arrangement of sensors.

For the purpose of illustration, in the following description, while the presently disclosed subject matter is described with respect to methods, systems, and computer program products for parallax estimation, e.g., for camera and LiDAR of an autonomous vehicle, one skilled in the art will recognize that the disclosed subject matter is not limited to the illustrative embodiments or aspects. For example, the methods, systems, and computer program products described herein may be used with a wide variety of settings, such as parallax estimation in any setting in which multiple sensors are being deployed but such sensors cannot occupy the same exact physical space, such as robotics, object detection, computer vision, and/or the like.

Referring now to FIG. 1, FIG. 1 is a diagram of a non-limiting embodiment or aspect of an environment 100 in which systems, products, and/or methods, as described herein, may be implemented. As shown in FIG. 1, environment 100 may include autonomous vehicle 102, parallax estimation/sensor placement system 106, first sensor 104a, second sensor 104b, and/or communication network 108.

Autonomous vehicle 102 may include a vehicle, as described herein. In some non-limiting embodiments or aspects, autonomous vehicle 102 may include one or more devices capable of receiving information from and/or communicating information to parallax estimation/sensor placement system 106, first sensor 104a, and/or second sensor 104b (e.g., directly, indirectly via communication network 108, and/or any other suitable communication technique). Additionally or alternatively, each autonomous vehicle 102 may include a device capable of receiving information from and/or communicating information to other autonomous vehicles 102 (e.g., directly, indirectly via communication network 108, and/or any other suitable communication technique). In some non-limiting embodiments or aspects, autonomous vehicle 102 may include at least one computing device, such as a vehicle on-board computing device, a portable and/or handheld device (e.g., a computer, a laptop, a personal digital assistant (PDA), a smartphone, a tablet, and/or the like), a server, and/or other like devices. For example, the vehicle may include at least one computing device (e.g., a vehicle on-board computing device) and at least one sensor (e.g., a first sensor 104a and/or a second sensor 104b), such as an image capture system (e.g., a camera and/or the like), a ray casting system (e.g., a LiDAR, a laser scanner, a radar, any combination thereof, and/or the like), any combination thereof, and/or the like, as described herein. In some non-limiting embodiments or aspects, autonomous vehicle 102 (e.g., the computing device thereof and/or the like) may be configured to generate map data based on the sensor(s). In some non-limiting embodiments or aspects, autonomous vehicle 102 may use map data and/or data from the sensor(s) to facilitate at least one autonomous driving operation of the autonomous vehicle 102, as described herein. In some non-limiting embodiments or aspects, autonomous vehicle 102 may detect at least one object using the sensor(s) onboard the vehicle.

First sensor 104a and second sensor 104b each may include at least one sensor, such as an object detection sensor (e.g., one or more image capture devices such as a camera, a LiDAR, a radar, a sonar, a laser scanner, any combination thereof, and/or the like), as described herein. In some non-limiting embodiments or aspects, first sensor 104a and/or second sensor 104b may include one or more devices capable of receiving information from and/or communicating information to autonomous vehicle 102 (e.g., a vehicle on-board computing device thereof) and/or parallax estimation/sensor placement system 106 (e.g., directly, indirectly via communication network 108, and/or any other suitable communication technique). Additionally or alternatively, each sensor (e.g., first sensor 104a and second sensor 104b) may include a device capable of receiving information from and/or communicating information to other sensors (e.g., directly, indirectly via communication network 108, and/or any other suitable communication technique). In some non-limiting embodiments or aspects, first sensor 104a and/or second sensor 104b may be part of autonomous vehicle 102.

Parallax estimation/sensor placement system 106 may include one or more devices capable of receiving information from and/or communicating information to autonomous vehicle 102, first sensor 104a, and/or second sensor 104b (e.g., directly, indirectly via communication network 108, and/or any other suitable communication technique). In some non-limiting embodiments or aspects, parallax estimation/sensor placement system 106 may include at least one computing device, such as a server, a group of servers, a desktop computer, a laptop, a portable and/or handheld device (e.g., a computer, a PDA, a smartphone, a tablet, and/or the like), and/or other like devices. In some non-limiting embodiments or aspects, parallax estimation/sensor placement system 106 may include a system (e.g., at least one computing device, such as at least one server and/or the like). In some non-limiting embodiments or aspects, parallax estimation/sensor placement system 106 may be in communication with a data storage device, which may be local or remote to parallax estimation/sensor placement system 106. In some non-limiting embodiments or aspects, parallax estimation/sensor placement system 106 may be capable of receiving information from, storing information in, communicating information to, or searching information stored in the data storage device. In some non-limiting embodiments or aspects, parallax estimation/sensor placement system 106 may be part of autonomous vehicle 102.

In some non-limiting embodiments or aspects, parallax estimation/sensor placement system 106 may generate a two-dimensional grid based on a field of view of first sensor 104a of autonomous vehicle 102, as described herein. For example, the grid may include a plurality of points. Additionally or alternatively, parallax estimation/sensor placement system 106 may determine, for each respective point of the plurality of points, a three-dimensional position of a respective intersection point between a first respective ray from first sensor 104a to the respective point of the plurality of points and a second respective ray from second sensor 104b of autonomous vehicle 102, as described herein. Additionally or alternatively, parallax estimation/sensor placement system 106 may determine, for each respective intersection point, a respective solid angle based on a first three-dimensional vector from first sensor 104a to the three-dimensional position of the respective intersection point and a second three-dimensional vector from second sensor 104b to the three-dimensional position of the respective intersection point, as described herein. Additionally or alternatively, parallax estimation/sensor placement system 106 may generate a matrix based on a first distance from first sensor 104a to each respective intersection point, a second distance from second sensor 104b to each respective intersection point, and the solid angle for each respective intersection point, as described herein. Additionally or alternatively, parallax estimation/sensor placement system 106 may extract at least one metric from the matrix, as described herein. In some non-limiting embodiments or aspects, an arrangement of first sensor 104a and second sensor 104b may be adjusted based on the metric(s), as described herein.

Communication network 108 may include one or more wired and/or wireless networks. For example, communication network 108 may include a cellular network (e.g., a long-term evolution (LTE) network, a third generation (3G) network, a fourth generation (4G) network, a fifth generation (5G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network (e.g., a private network associated with a transaction service provider), an ad hoc network, an intranet, the Internet, a fiber optic-based network, a cloud computing network, and/or the like, and/or a combination of these or other types of networks.

The number and arrangement of systems, sensors, and/or networks shown in FIG. 1 are provided as an example. There may be additional systems, sensors, and/or networks; fewer systems, sensors, and/or networks; different systems, sensors, and/or networks; and/or differently arranged systems, sensors, and/or networks than those shown in FIG. 1. Furthermore, two or more systems or sensors shown in FIG. 1 may be implemented within a single system or sensor, or a single system or sensor shown in FIG. 1 may be implemented as multiple, distributed systems or sensors. Additionally or alternatively, a set of systems (e.g., one or more systems) or a set of sensors (e.g., one or more sensors) of environment 100 may perform one or more functions described as being performed by another set of systems or another set of sensors of environment 100.

Figure 2:
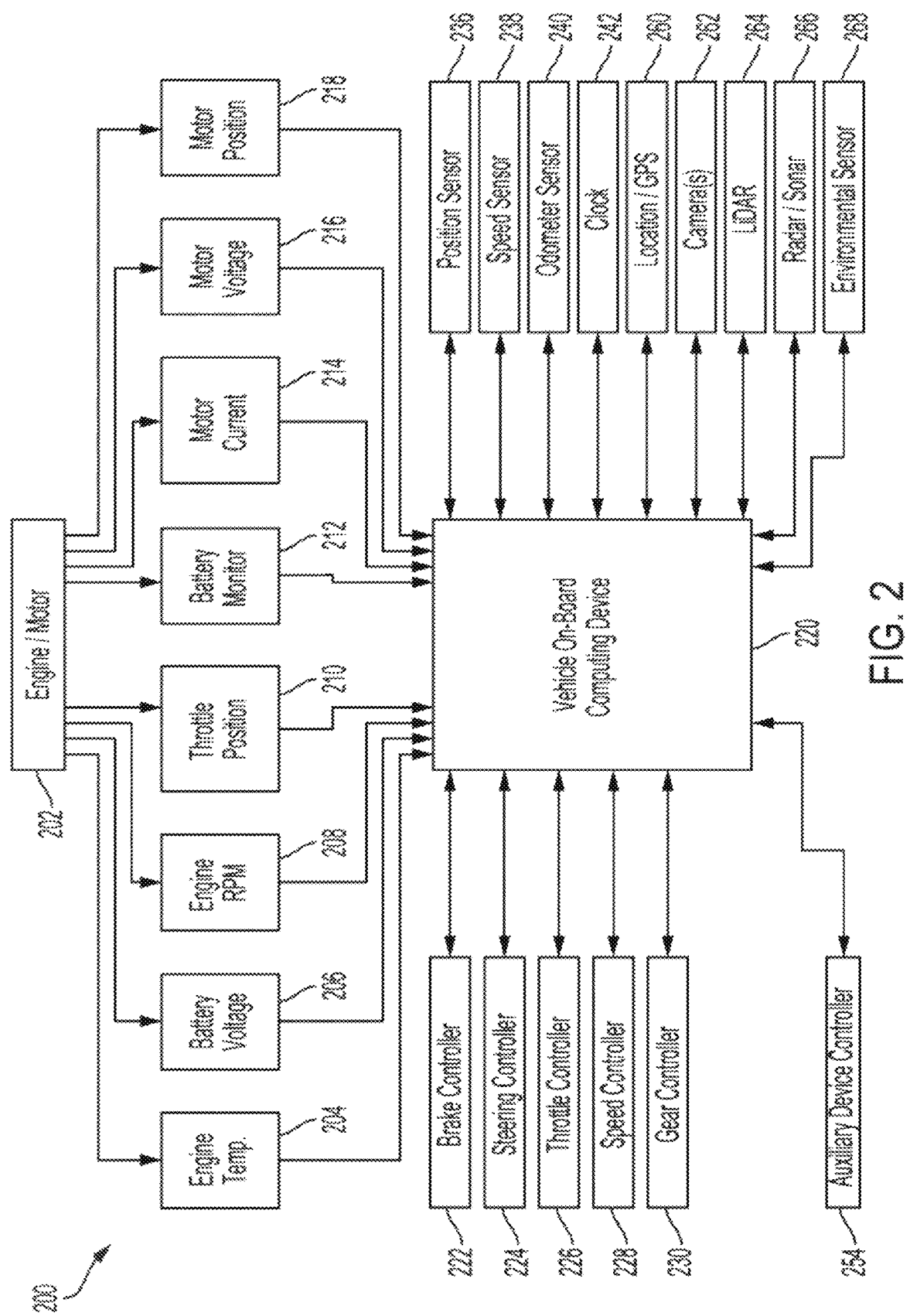
FIG. 2 is an illustration of an illustrative architecture for a vehicle according to the principles of the presently disclosed subject matter.

Referring now to FIG. 2, FIG. 2 is an illustration of an illustrative system architecture 200 for a vehicle. Autonomous vehicle 102 may include a same or similar system architecture as that of system architecture 200 shown in FIG. 2.

As shown in FIG. 2, system architecture 200 may include engine or motor 202 and various sensors 204-218 for measuring various parameters of the vehicle. In gas-powered or hybrid vehicles having a fuel-powered engine, the sensors may include, for example, engine temperature sensor 204, battery voltage sensor 206, engine rotations per minute (RPM) sensor 208, and/or throttle position sensor 210. In an electric or hybrid vehicle, the vehicle may have an electric motor, and may have sensors such as battery monitoring sensor 212 (e.g., to measure current, voltage, and/or temperature of the battery), motor current sensor 214, motor voltage sensor 216, and/or motor position sensors 218, such as resolvers and encoders.

System architecture 200 may include operational parameter sensors, which may be common to both types of vehicles, and may include, for example: position sensor 236 such as an accelerometer, gyroscope and/or inertial measurement unit; speed sensor 238; and/or odometer sensor 240. System architecture 200 may include clock 242 that the system 200 uses to determine vehicle time during operation. Clock 242 may be encoded into the vehicle on-board computing device 220, it may be a separate device, or multiple clocks may be available.

System architecture 200 may include various sensors that operate to gather information about an environment in which the vehicle is operating and/or traveling. These sensors may include, for example: location sensor 260 (e.g., a Global Positioning System (GPS) device); object detection sensors such as one or more cameras 262; LiDAR sensor system 264; and/or radar and/or sonar system 266. The sensors may include environmental sensors 268 such as a precipitation sensor and/or ambient temperature sensor. The object detection sensors may enable the system architecture 200 to detect objects that are within a given distance range of the vehicle in any direction, and the environmental sensors 268 may collect data about environmental conditions within an area of operation and/or travel of the vehicle.

During operation of system architecture 200, information is communicated from the sensors of system architecture 200 to on-board computing device 220. Vehicle on-board computing device 220 analyzes the data captured by the sensors and optionally controls operations of the vehicle based on results of the analysis. For example, vehicle on-board computing device 220 may control: braking via a brake controller 222; direction via steering controller 224; speed and acceleration via throttle controller 226 (e.g., in a gas-powered vehicle) or motor speed controller 228 such as a current level controller (e.g., in an electric vehicle); differential gear controller 230 (e.g., in vehicles with transmissions); and/or other controllers such as auxiliary device controller 254.

Geographic location information may be communicated from location sensor 260 to vehicle on-board computing device 220, which may access a map of the environment including map data that corresponds to the location information to determine known fixed features of the environment such as streets, buildings, stop signs and/or stop/go signals. Captured images from cameras 262 and/or object detection information captured from sensors such as LiDAR sensor system 264 and/or radar and/or sonar system 266 is communicated from those sensors to vehicle on-board computing device 220. The object detection information and/or captured images are processed by on-board computing device 220 to detect objects in proximity to the vehicle. Any known or to be known technique for making an object detection based on sensor data and/or captured images can be used in the embodiments disclosed in this document. Vehicle on-board computing device 220 may generate new map data (e.g., based on object detection data captured from sensors such as LiDAR 264, captured images from cameras 262, the map data, and/or the like). Additionally or alternatively, vehicle on-board computing device 220 may communicate sensor data (e.g., object detection data captured from sensors such as LiDAR 264, captured images from cameras 262, and/or the like) to a remote system (e.g., mapping system 106), which may generate new map data based on the sensor data.

Figure 3:
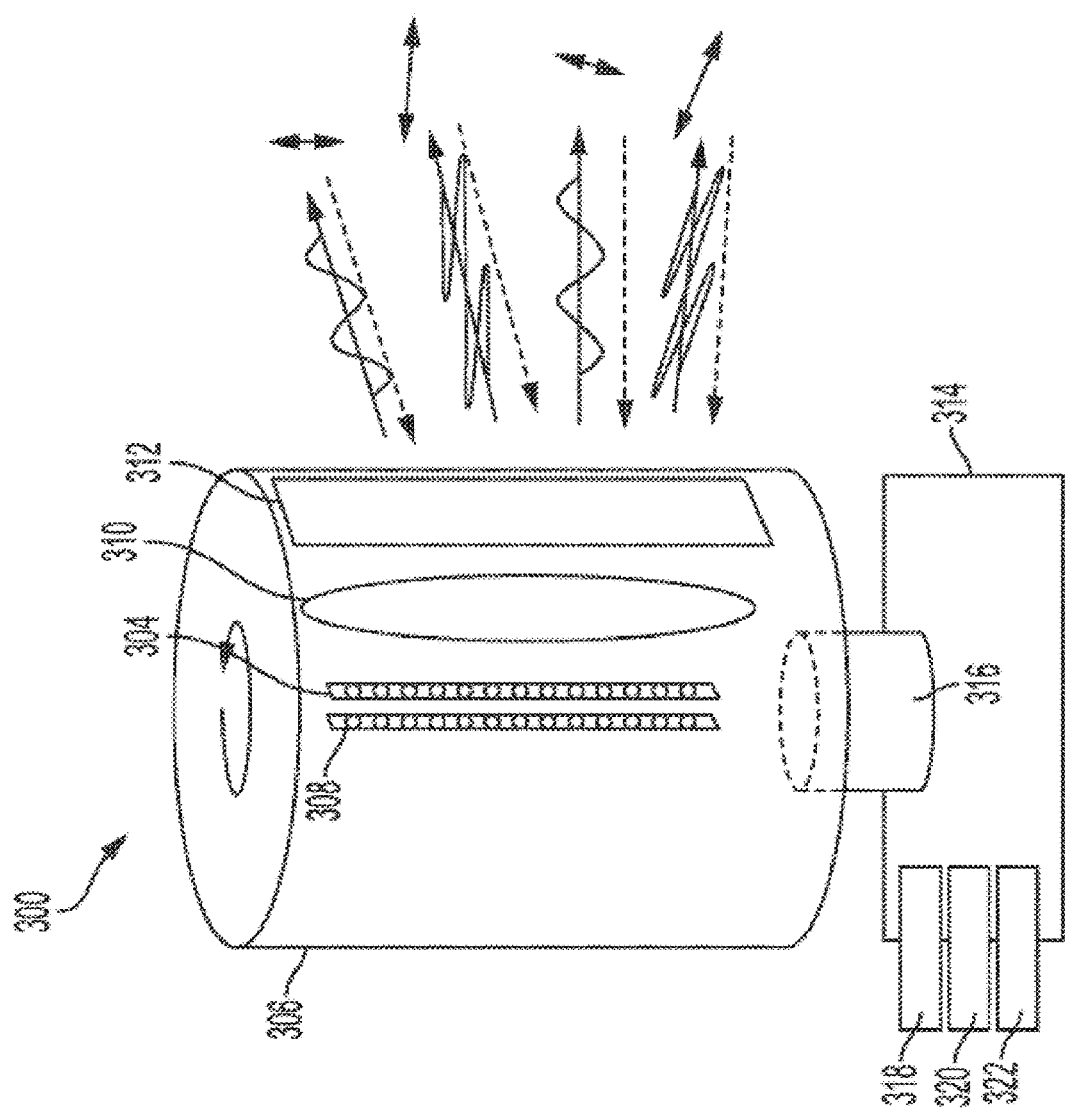
FIG. 3 is an illustration of an illustrative architecture for a LiDAR system according to the principles of the presently disclosed subject matter.

Referring now to FIG. 3, FIG. 3 is an illustration of an illustrative LiDAR system 300. LiDAR system 264 of FIG. 2 may be the same as or substantially similar to LiDAR system 300.

As shown in FIG. 3, LiDAR system 300 may include housing 306, which may be rotatable 360° about a central axis such as hub or axle 316. Housing 306 may include an emitter/receiver aperture 312 made of a material transparent to light. Although a single aperture is shown in FIG. 3, non-limiting embodiments or aspects of the present disclosure are not limited in this regard. In other scenarios, multiple apertures for emitting and/or receiving light may be provided. Either way, LiDAR system 300 can emit light through one or more of aperture(s) 312 and receive reflected light back toward one or more of aperture(s) 312 as housing 306 rotates around the internal components. In an alternative scenario, the outer shell of housing 306 may be a stationary dome, at least partially made of a material that is transparent to light, with rotatable components inside of housing 306.

Inside the rotating shell or stationary dome is a light emitter system 304 that is configured and positioned to generate and emit pulses of light through aperture 312 or through the transparent dome of housing 306 via one or more laser emitter chips or other light emitting devices. Emitter system 304 may include any number of individual emitters (e.g., 8 emitters, 64 emitters, 128 emitters, etc.). The emitters may emit light of substantially the same intensity or of varying intensities. The individual beams emitted by light emitter system 304 may have a well-defined state of polarization that is not the same across the entire array. As an example, some beams may have vertical polarization and other beams may have horizontal polarization. LiDAR system 300 may include light detector 308 containing a photodetector or array of photodetectors positioned and configured to receive light reflected back into the system. Emitter system 304 and light detector 308 may rotate with the rotating shell, or emitter system 304 and light detector 308 may rotate inside the stationary dome of housing 306. One or more optical element structures 310 may be positioned in front of light emitting unit 304 and/or light detector 308 to serve as one or more lenses and/or waveplates that focus and direct light that is passed through optical element structure 310.

One or more optical element structures 310 may be positioned in front of a mirror to focus and direct light that is passed through optical element structure 310. As described herein below, LiDAR system 300 may include optical element structure 310 positioned in front of a mirror and connected to the rotating elements of LiDAR system 300 so that optical element structure 310 rotates with the mirror. Alternatively or in addition, optical element structure 310 may include multiple such structures (e.g., lenses, waveplates, etc.). In some non-limiting embodiments or aspects, multiple optical element structures 310 may be arranged in an array on or integral with the shell portion of housing 306.

In some non-limiting embodiments or aspects, each optical element structure 310 may include a beam splitter that separates light that the system receives from light that the system generates. The beam splitter may include, for example, a quarter-wave or half-wave waveplate to perform the separation and ensure that received light is directed to the receiver unit rather than to the emitter system (which could occur without such a waveplate as the emitted light and received light should exhibit the same or similar polarizations).

LiDAR system 300 may include power unit 318 to power the light emitting unit 304, motor 316, and electronic components. LiDAR system 300 may include an analyzer 314 with elements such as processor 322 and non-transitory computer-readable memory 320 containing programming instructions that are configured to enable the system to receive data collected by the light detector unit, analyze the data to measure characteristics of the light received, and generate information that a connected system can use to make decisions about operating in an environment from which the data was collected. Analyzer 314 may be integral with the LiDAR system 300 as shown, or some or all of analyzer 314 may be external to LiDAR system 300 and communicatively connected to LiDAR system 300 via a wired and/or wireless communication network or link.

Figure 4:
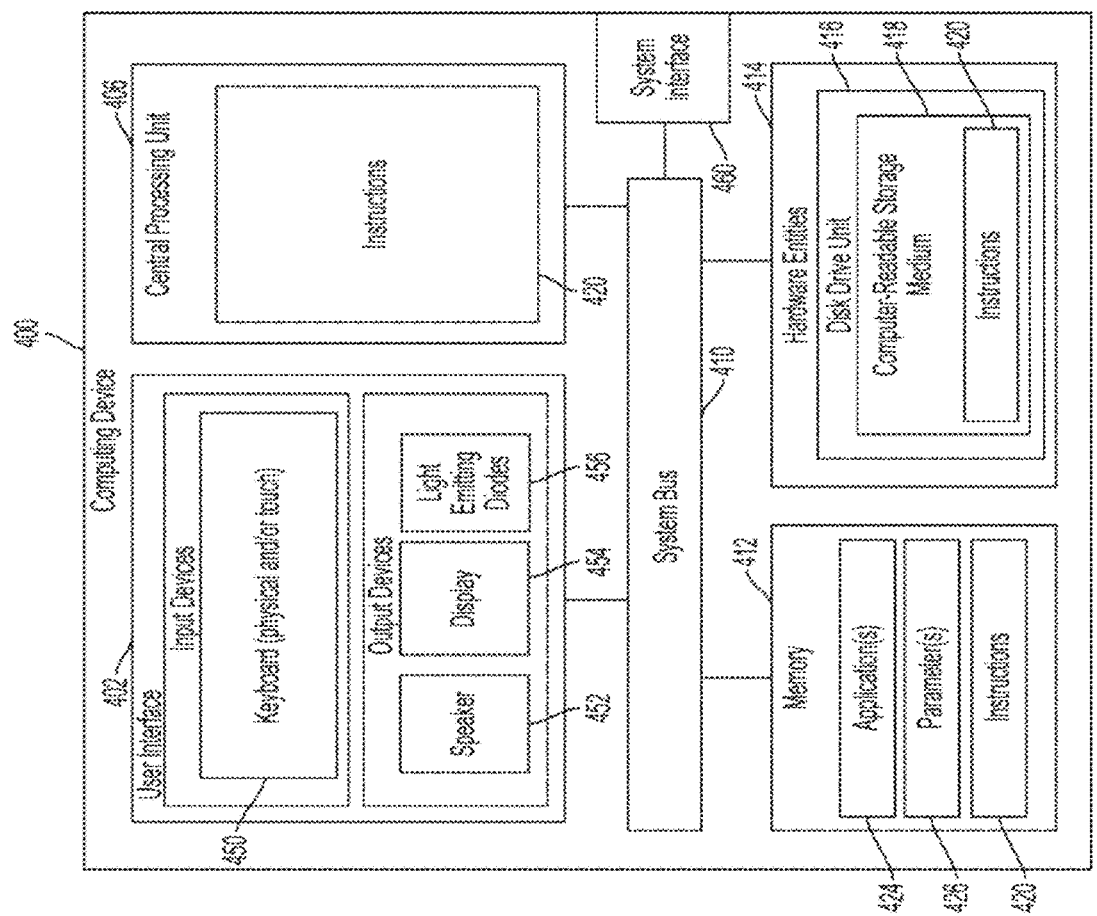
FIG. 4 is an illustration of an illustrative computing device according to the principles of the presently disclosed subject matter.

Referring now to FIG. 4, FIG. 4 is an illustration of an illustrative architecture for a computing device 400. Computing device 400 can correspond to one or more devices of (e.g., one or more devices of a system of) autonomous vehicle 102, sensor 104a, sensor 104b, and/or one or more devices of parallax estimation/sensor placement system 106. In some non-limiting embodiments or aspects, one or more devices of (e.g., one or more devices of a system of) autonomous vehicle 102, sensor 104a, sensor 104b, and/or parallax estimation/sensor placement system 106 may include at least one computing device 400 and/or at least one component of computing device 400.

The number and arrangement of components shown in FIG. 4 are provided as an example. In some non-limiting embodiments or aspects, computing device 400 may include additional components, fewer components, different components, or differently arranged components than those shown in FIG. 4. Additionally, or alternatively, a set of components (e.g., one or more components) of computing device 400 may perform one or more functions described as being performed by another set of components of device 400.

As shown in FIG. 4, computing device 400 comprises user interface 402, Central Processing Unit (CPU) 406, system bus 410, memory 412 connected to and accessible by other portions of computing device 400 through system bus 410, system interface 460, and hardware entities 414 connected to system bus 410. User interface 402 can include input devices and output devices, which facilitate user-software interactions for controlling operations of the computing device 400. The input devices may include, but are not limited to, physical and/or touch keyboard 450. The input devices can be connected to computing device 400 via a wired and/or wireless connection (e.g., a Bluetooth® connection). The output devices may include, but are not limited to, speaker 452, display 454, and/or light emitting diodes 456. System interface 460 is configured to facilitate wired and/or wireless communications to and from external devices (e.g., network nodes such as access points, etc.).

At least some of hardware entities 414 may perform actions involving access to and use of memory 412, which can be a Random Access Memory (RAM), a disk drive, flash memory, a Compact Disc Read Only Memory (CD-ROM) and/or another hardware device that is capable of storing instructions and data. Hardware entities 414 can include disk drive unit 416 comprising computer-readable storage medium 418 on which is stored one or more sets of instructions 420 (e.g., software code) configured to implement one or more of the methodologies, procedures, or functions described herein. Instructions 420, applications 424, and/or parameters 426 can also reside, completely or at least partially, within memory 412 and/or within CPU 406 during execution and/or use thereof by computing device 400. Memory 412 and CPU 406 may include machine-readable media. The term "machine-readable media," as used herein, may refer to a single medium or multiple media (e.g., a centralized or distributed database, and/or associated caches and server) that store the one or more sets of instructions 420. The term "machine readable media," as used herein, may refer to any medium that is capable of storing, encoding or carrying a set of instructions 420 for execution by computing device 400 and that cause computing device 400 to perform any one or more of the methodologies of the present disclosure.

Figure 5:
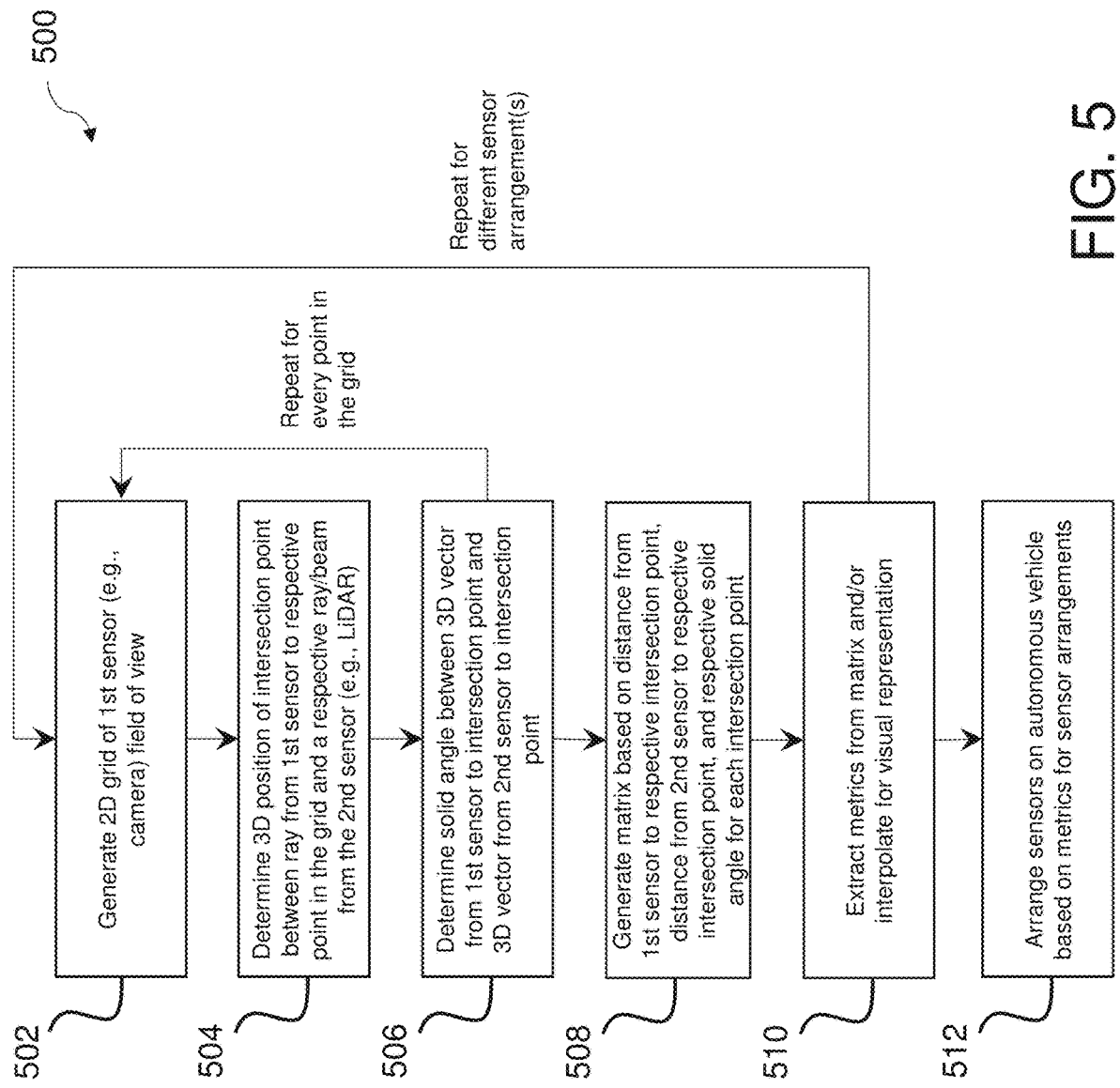
FIG. 5 is a flowchart of a non-limiting embodiment or aspect of a process for parallax estimation for sensors (e.g., camera and LiDAR) for autonomous vehicles according to the principles of the presently disclosed subject matter.

Referring now to FIG. 5, FIG. 5 is a flowchart of a non-limiting embodiment or aspect of a process 500 for parallax estimation for sensors (e.g., camera and LiDAR) for autonomous vehicles. In some non-limiting embodiments or aspects, one or more of the steps of process 500 may be performed (e.g., completely, partially, and/or the like) by parallax estimation/sensor placement system 106 (e.g., one or more devices of parallax estimation/sensor placement system 106). In some non-limiting embodiments or aspects, one or more of the steps of process 500 may be performed (e.g., completely, partially, and/or the like) by another system, another device, another group of systems, or another group of devices, separate from or including parallax estimation/sensor placement system 106, such as autonomous vehicle 102, sensor 104a, sensor 104b, and/or the like.

As shown in FIG. 5, at step 502, process 500 may include generating a two-dimensional grid of the field of view of a first sensor. For example, parallax estimation/sensor placement system 106 may generate a two-dimensional grid based on a field of view of first sensor 104a of autonomous vehicle 102. In some non-limiting embodiments or aspects, the grid comprising a plurality of points.

In some non-limiting embodiments or aspects, first sensor 104a may include an image capture system. Additionally or alternatively, second sensor 104b may include a ray casting system. For example, first sensor 104a may include a camera and second sensor 104b may include a LiDAR.

Figure 6A:
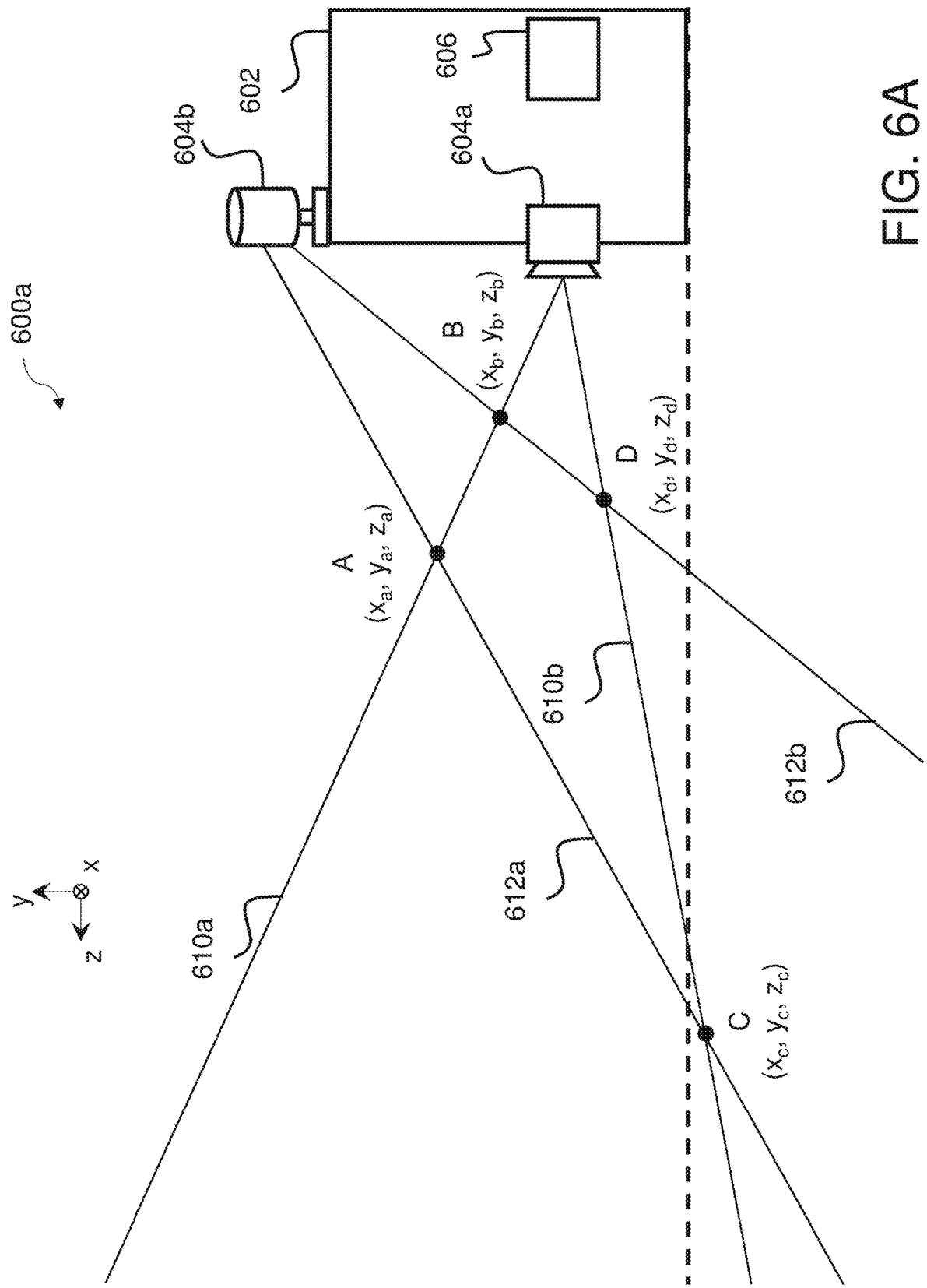
FIG. 6A is a diagram of an exemplary implementation of a non-limiting embodiment or aspect of the process shown in FIG. 5 according to the principles of the presently disclosed subject matter.
Figure 6B:
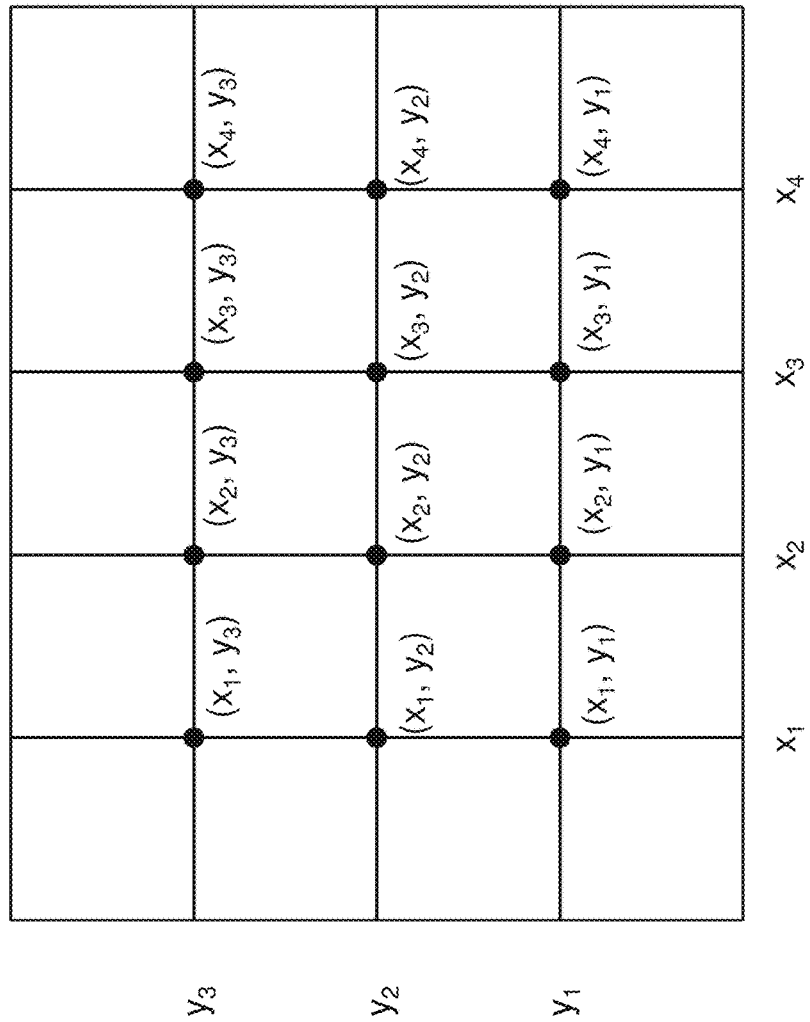
FIG. 6B is a diagram of an exemplary grid of a camera field of view according to the principles of the presently disclosed subject matter.

Referring now to FIGS. 6A and 6B, and with continued reference to FIG. 5, FIG. 6A is a diagram of an exemplary implementation 600a of a non-limiting embodiment or aspect of process 500. As shown in FIG. 6A, implementation 600a may include autonomous vehicle 602, camera 604a, LiDAR 604b, parallax estimation/sensor placement system 606, rays 610a and 610b, beams 612a and 612b, and intersection points A-D. In some non-limiting embodiments or aspects, autonomous vehicle 602 may be the same as or similar to autonomous vehicle 102. In some non-limiting embodiments or aspects, camera 604a may be the same as or similar to first sensor 104a and/or camera 262. In some non-limiting embodiments or aspects, LiDAR 604b may be the same as or similar to second sensor 104b, LiDAR 264, and/or LiDAR system 300. In some non-limiting embodiments or aspects, parallax estimation/sensor placement system 606 may be the same as or similar to parallax estimation/sensor placement system 106. FIG. 6B is a diagram of an exemplary grid of a field of view 600b (e.g., of first sensor 104a and/or camera 604a).

For the purpose of illustration, as shown in FIG. 6B, field of view 600b may be two-dimensional. For example, field of view 600b may include a horizontal dimension (e.g., an x dimension) and a vertical dimension (e.g., a y dimension).

In some non-limiting embodiments or aspects, generating a two-dimensional grid on field of view 600b may include generating a plurality of horizontal lines and/or generating a plurality of vertical lines across field of view 600b. For example, parallax estimation/sensor placement system 106, 606 may generate a plurality of horizontal lines and a plurality of vertical lines across field of view 600b. As shown in FIG. 6B, parallax estimation/sensor placement system 106, 606 may generate three horizontal lines at $y_1$, $y_2$, and $y_3$ and four vertical lines at $x_1$, $x_2$, $x_3$, and $x_4$. In some non-limiting embodiments or aspects, each respective intersection between a respective horizontal line and a respective vertical line may include a respective point of the plurality of points of the grid. For example, as shown in FIG. 6B, the following 12 points are shown in the grid: $(x_1, y_1)$, $(x_2, y_1)$, $(x_3, y_1)$, $(x_4, y_1)$, $(x_1, y_2)$, $(x_2, y_2)$, $(x_3, y_2)$, $(x_4, y_2)$, $(x_1, y_3)$, $(x_2, y_3)$, $(x_3, y_3)$, $(x_4, y_3)$. The number of horizontal lines, the number of vertical lines, and the number of points shown in FIG. 6B are provided as an example. In some non-limiting embodiments or aspects, the number of horizontal and/or vertical lines (and therefore the resulting number of points) may be selected based on the resolution of first sensor 104a (e.g., camera 604a). For example, the number of horizontal lines may be any number from one to the number of horizontal pixels of first sensor 104a (e.g., camera 604a), and the number of vertical lines may be any number from one to the number of vertical pixels of first sensor 104a (e.g., camera 604a). In some non-limiting embodiments or aspects, the number of horizontal and/or vertical lines (and therefore the resulting number of points) may be selected based on a tradeoff between computational resources required (e.g., more lines may result in more points in the grid for which calculations must be performed, which may consume additional resources, while less lines may result in fewer resources and faster completion of calculations) and granularity (e.g., more lines may result in a finer level of detail, while less lines may result in a coarser level of detail). For example, the number of horizontal and vertical lines may be selected to have sufficient granularity to meaningfully compare metrics indicative of parallax between different arrangements of sensors while avoiding wastefulness of computational resources and delays due to longer processing time. As such, the number of horizontal and vertical lines and/or the resulting number or points in the grid may be selected as a tradeoff of computational resources and/or processing time with accuracy (e.g., greater accuracy may be desired for some sensors than others, based on the characteristics of the sensors and/or functions performed based on data from the sensors). In some non-limiting embodiments or aspects, the number of horizontal lines may be the same as the number of vertical lines. Additionally or alternatively, the ratio of the number of horizontal lines to the number of vertical lines may be the same as the ratio of the number of horizontal pixels to the number of vertical pixels.

With continued reference to FIG. 5, in some non-limiting embodiments or aspects, each point in the grid may be associated with an azimuth (e.g., azimuth angle) and an elevation (e.g., elevation angle) with respect to first sensor 104a (e.g., with respect to a center of a lens of camera 604a). For example, a first point may have a first azimuth and a first elevation, a second point may have a second azimuth and a second elevation, etc. In some non-limiting embodiments or aspects, parallax estimation/sensor placement system 106, 606 may determine the respective azimuth and the respective elevation for each point of the grid (e.g., with respect to first sensor 104a and/or the center of the lens of camera 604a).

In some non-limiting embodiments or aspects, before generating the grid, parallax estimation/sensor placement system 106, 606 may receive at least one of first sensor parameters for first sensor 104a (e.g., camera 604a), first position data associated with a first position of first sensor 104a (e.g., camera 604a), first orientation data associated with a first orientation of first sensor 104a (e.g., camera 604a), second sensor parameters for second sensor 104b (e.g., LiDAR 604b), second position data associated with a second position of second sensor 104b (e.g., LiDAR 604b), second orientation data associated with a second orientation of second sensor 104b (e.g., LiDAR 604b), any combination thereof, and/or the like. In some non-limiting embodiments or aspects, the first sensor parameters may include the field of view of first sensor 104a (e.g., camera 604a), the resolution of first sensor 104a (e.g., camera 604a), the azimuth and elevation of each pixel of first sensor 104a (e.g., camera 604a), any combination thereof, and/or the like. Additionally or alternatively, the first position data may include the three-dimensional (e.g., x, y, z) position of first sensor 104a (e.g., three-dimensional position of camera 604a with respect to autonomous vehicle 602). Additionally or alternatively, the first orientation data may include the roll and/or pitch orientation of first sensor 104a (e.g., roll and/or pitch orientation of camera 604a with respect to autonomous vehicle 602). In some non-limiting embodiments or aspects, the second sensor parameters may include ray data associated with a plurality of rays cast by second sensor 104b (e.g., beam data associated with a plurality of beams 612a, 612b cast by LiDAR 604b), the beam width of second sensor 104b (e.g., LiDAR 604b), any combination thereof, and/or the like. Additionally or alternatively, the second position data may include the three-dimensional position of second sensor 104b (e.g., three-dimensional position of LiDAR 604b with respect to autonomous vehicle 602). Additionally or alternatively, the second orientation data may include the roll and/or pitch orientation of second sensor 104b (e.g., roll and/or pitch orientation of LiDAR 604b with respect to autonomous vehicle 602).

As shown in FIG. 5, at step 504, process 500 may include determining the three-dimensional position of an intersection point between a ray from the first sensor to a respective point in the grid and a respective ray from the second sensor. For example, parallax estimation/sensor placement system 106, 606 may determine (e.g., for each respective point of the plurality of points in the grid) a three-dimensional position of a respective intersection point between a first respective ray from first sensor 104a (e.g., camera 604a) to a respective point of the plurality of points and a second respective ray from second sensor 104b (e.g., LiDAR 604b).

For the purpose of illustration, with reference to FIG. 6A and continued reference to FIG. 5, parallax estimation/sensor placement system 606 may determine a three-dimensional position of intersection point A between first ray 610a from camera 604a and first beam 612a from LiDAR 604b to be $(x_a, y_a, z_a)$. Additionally or alternatively, parallax estimation/sensor placement system 606 may determine a three-dimensional position of intersection point B between first ray 610a from camera 604a and second beam 612b from LiDAR 604b to be $(x_b, y_b, z_b)$. Additionally or alternatively, parallax estimation/sensor placement system 606 may determine a three-dimensional position of intersection point C between second ray 610b from camera 604a and first beam 612a from LiDAR 604b to be $(x_c, y_c, z_c)$. Additionally or alternatively, parallax estimation/sensor placement system 606 may determine a three-dimensional position of intersection point D between second ray 610b from camera 604a and second beam 612b from LiDAR 604b to be $(x_d, y_d, z_d)$.

In some non-limiting embodiments or aspects, parallax estimation/sensor placement system 106 may determine the first respective ray from first sensor 104a to each respective point in the grid based on the azimuth and the elevation for each respective point with respect to first sensor 104a. For example, parallax estimation/sensor placement system 606 may determine first ray 610a from camera 604a based on the azimuth and the elevation for a first respective point in the grid and/or may determine second ray 610b from camera 604a based on the azimuth and the elevation for a second respective point in the grid (e.g., with respect to a center of a lens of camera 604a).

In some non-limiting embodiments or aspects, parallax estimation/sensor placement system 106 may determine that the second respective ray from second sensor 104b based on a worst-case ray of a plurality of rays cast by second sensor 104b. For example, parallax estimation/sensor placement system 606 may determine the worst-case ray is a lowest beam (e.g., having a lowest elevation) from LiDAR 604b if LiDAR 604b is positioned above camera 604a or a highest beam (e.g., having a highest elevation) from LiDAR 604b if LiDAR 604b is positioned below camera 604a. For the purpose of illustration, second beam 612b may have a lower elevation than beam 612a and, therefore, may be selected as the second respective ray (e.g., the worst-case beam). Thus, with respect to first ray 610a, second beam 612b may be selected as the second respective ray, and intersection point B may be the respective intersection point therebetween (and intersection point A may be ignored, unless intersection point B does not satisfy a boundary condition and intersection point A may be used in lieu of intersection point B, as further described below). Additionally or alternatively, with respect to second ray 610b, second beam 612b may be selected as the second respective ray, and intersection point D may be the respective intersection point therebetween (and intersection point C may be ignored, unless intersection point D does not satisfy a boundary condition and intersection point C may be used in lieu of intersection point D, as further described below).

In some non-limiting embodiments or aspects, parallax estimation/sensor placement system 106, 606 may receive boundary data associated with at least one boundary condition. For example, the boundary condition(s) may include at least one of a first minimum range for first sensor 104a (e.g., camera 604a), a second minimum range for second sensor 104b (e.g., LiDAR 604b), a first maximum range for first sensor 104a (e.g., camera 604a), a second maximum range for second sensor 104b (e.g., LiDAR 604b), a ground surface position of a ground surface upon which autonomous vehicle 102, 602 is located, a boundary associated with the self-occlusion of the vehicle to first sensor 104a (e.g., camera 604a) and/or second sensor 104b (e.g., LiDAR 604b), azimuthal and/or elevation boundaries of the field of view of first sensor 104a (e.g., camera 604a), azimuthal and/or elevation boundaries of the field of view of second sensor 104b (e.g., LiDAR 604b), boundaries based on a target (e.g., selected) area within the field of view of first sensor 104a (e.g., camera 604a) and/or second sensor 104b (e.g., LiDAR 604b), boundaries based on a specific object within the field of view of first sensor 104a (e.g., camera 604a) and/or second sensor 104b (e.g., LiDAR 604b), any combination thereof, and/or the like. For the purpose of illustration, as shown in FIG. 6A, the ground surface is illustrated as a dashed line below autonomous vehicle 602. In some non-limiting embodiments or aspects, parallax estimation/sensor placement system 106, 606 may determine that at least one intersection point of the plurality of intersection points does not satisfy at least one of the boundary condition(s). For the purpose of illustration, as shown in FIG. 6A, if intersection point C is initially selected as the respective intersection point for second ray 610, parallax estimation/sensor placement system 606 may determine that intersection point C does not satisfy a boundary condition associated with the ground surface because intersection point C is located below the ground surface. In some non-limiting embodiments or aspects, parallax estimation/sensor placement system 106, 606 may replace the initially selected intersection point with a replacement intersection point between the first respective ray from first sensor 104a and another beam from second sensor 104b (e.g., a lowest remaining beam having a lowest remaining elevation if LiDAR 604b is positioned above camera 604a or a highest remaining beam having a highest remaining elevation if LiDAR 604b is positioned below camera 604a), and the replacement intersection point may satisfy the at least one boundary condition. For the purpose of illustration, as shown in FIG. 6A, parallax estimation/sensor placement system 106, 606 may replace intersection point C with intersection point D, since intersection point D does satisfy the boundary condition associated with the ground surface because intersection point D is located above the ground surface.

With continued reference to FIG. 5, as shown at step 506, process 500 may include determining a solid angle between a three-dimensional vector from the first sensor to the respective intersection point and a three-dimensional vector from the second sensor to the respective intersection point. For example, parallax estimation/sensor placement system 106 may determine (e.g., for each respective intersection point of the plurality of intersection points) a respective solid angle based on a first three-dimensional vector from first sensor 104a to the three-dimensional position of the respective intersection point and a second three-dimensional vector from second sensor 104b to the three-dimensional position of the respective intersection point.

For the purpose of illustration, with reference to FIG. 6A and continued reference to FIG. 5, parallax estimation/sensor placement system 606 may determine, for intersection point B, a respective solid angle based on a first three-dimensional vector from camera 604a to intersection point B and a second three-dimensional vector from LiDAR 604b to intersection point B. Additionally or alternatively, parallax estimation/sensor placement system 606 may determine, for intersection point D, a respective solid angle based on a first three-dimensional vector from camera 604a to intersection point D and a second three-dimensional vector from LiDAR 604b to intersection point D.

With continued reference to FIG. 5, in some non-limiting embodiments or aspects, parallax estimation/sensor placement system 106, 606 may generate each respective first three-dimensional vector based on the three-dimensional position of the respective intersection point (e.g., $(x_b, y_b, z_b)$ for intersection point B, $(x_d, y_d, z_d)$ for intersection point D, and/or the like) and a first three-dimensional position of first sensor 104a (e.g., $(x_{camera}, y_{camera}, z_{camera})$ for camera 604a). Additionally or alternatively, parallax estimation/sensor placement system 106, 606 may generate the second three-dimensional vector based on the three-dimensional position of the respective intersection point (e.g., $(x_b, y_b, z_b)$ for intersection point B, $(x_d, y_d, z_d)$ for intersection point D, and/or the like) and a second three-dimensional position of second sensor 104b (e.g., $(x_{lidar}, y_{lidar}, z_{lidar})$ for LiDAR 604b).

In some non-limiting embodiments or aspects, parallax estimation/sensor placement system 106, 606 may generate a first unit vector based on the first three-dimensional vector and/or generate a second unit vector based on the second three-dimensional vector. Additionally or alternatively, parallax estimation/sensor placement system 106, 606 may calculate the solid angle based on the first unit vector and the second unit vector.

In some non-limiting embodiments or aspects, parallax estimation/sensor placement system 106 may repeat steps 502-506 for every point in the grid.

As shown in FIG. 5, at step 508, process 500 may include generating a matrix based on a distance from the first sensor to the respective intersection point, a distance from the second sensor to the respective intersection point, and the respective solid angle for each intersection point. For example, parallax estimation/sensor placement system 106 may generate a matrix based on a first distance from first sensor 104a to each respective intersection point, a second distance from second sensor 104b to each respective intersection point, and the solid angle determined for each respective intersection point.

In some non-limiting embodiments or aspects, generating the matrix may include generating (e.g., by parallax estimation/sensor placement system 106) a 3×n matrix, wherein n may be the number of (determined and/or selected) intersection points. Additionally or alternatively, parallax estimation/sensor placement system 106 may populate each respective column of the 3×n matrix with the first distance from the first sensor to the respective intersection point (e.g., as the element for the first row of that respective column), the second distance from the second sensor to the respective intersection point (e.g., as the element for the second row of that respective column), and the solid angle for the respective intersection point (e.g., as the element for the third row of that respective column).

For the purpose of illustration, with reference to FIG. 6A and continued reference to FIG. 5, parallax estimation/sensor placement system 606 may generate a matrix based on a distance from camera 604a to intersection point B (e.g., $d_{cam-b}$), a distance from LiDAR 604b to intersection point B (e.g., $d_{lidar-b}$), the solid angle determined for intersection point B (e.g., $\Omega_b$), a distance from camera 604a to intersection point D (e.g., $d_{cam-b}$), a distance from LiDAR 604b to intersection point D (e.g., $d_{lidar-d}$), and the solid angle determined for intersection point D (e.g., $\Omega_d$). For example, this matrix may be a 3×2 matrix (e.g., a 3×n matrix wherein n=2) as follows:

$$\begin{bmatrix} d_{cam-b} & d_{cam-d} \\ d_{lidar-b} & d_{lidar-d} \\ \Omega_b & \Omega_d \end{bmatrix}$$

With continued reference to FIG. 5, as shown at step 510, process 500 may include extracting at least one metric from the matrix (or a portion thereof) and/or interpolating the grid for visual representation (e.g., based on the metric(s)). For example, parallax estimation/sensor placement system 106 may extract at least one metric from the matrix (or a portion thereof).

In some non-limiting embodiments or aspects, extracting the at least one metric from the matrix may include determining (e.g., by parallax estimation/sensor placement system 106) a minimum solid angle based on the matrix (or a portion thereof), a maximum solid angle based on the matrix (or a portion thereof), a minimum range of solid angles based on the matrix (or a portion thereof), a maximum range of solid angles based on the matrix (or a portion thereof), a spread of solid angles based on the matrix (or a portion thereof), an average of solid angles based on the matrix (or a portion thereof), a standard deviation of solid angles based on the matrix (or a portion thereof), a three-sigma range of solid angles based on the matrix (or a portion thereof), a minimum first distance based on the matrix (or a portion thereof), a maximum first distance based on the matrix (or a portion thereof), a minimum range of first distances based on the matrix (or a portion thereof), a maximum range of first distances based on the matrix (or a portion thereof), a spread of first distances based on the matrix (or a portion thereof), an average of first distances based on the matrix (or a portion thereof), a standard deviation of first distances based on the matrix (or a portion thereof), a three-sigma range of first distances based on the matrix (or a portion thereof), a minimum second distance based on the matrix (or a portion thereof), a maximum second distance based on the matrix (or a portion thereof), a minimum range of second distances based on the matrix (or a portion thereof), a maximum range of second distances based on the matrix (or a portion thereof), a spread of second distances based on the matrix (or a portion thereof), an average of second distances based on the matrix (or a portion thereof), a standard deviation of second distances based on the matrix (or a portion thereof), a three-sigma range of second distances based on the matrix (or a portion thereof), a determination of which azimuth and/or elevation of first sensor 104a (e.g., camera 604a) and/or second sensor 104b (e.g., LiDAR 604*b*) is represented by each respective element in the matrix (or a portion thereof), any combination thereof, and/or the like.

In some non-limiting embodiments or aspects, parallax estimation/sensor placement system 106 may interpolate the two-dimensional grid based on the metric(s) extracted from the matrix. For example, since each respective point in the grid corresponds to a respective intersection point and a respective solid angle, interpolating may include determining (e.g., by parallax estimation/sensor placement system 106) a value (e.g., pixel value such as color or shade) based on a selected metric of each respective point in the grid. Additionally or alternatively, parallax estimation/sensor placement system 106 may render and/or display a visual representation based on interpolating the two-dimensional grid. For example, parallax estimation/sensor placement system 106 may render and/or display a gradient of at least one of colors or shades based on the values (e.g., pixel values) for each point in the grid as a two-dimensional image.

Figure 6D:
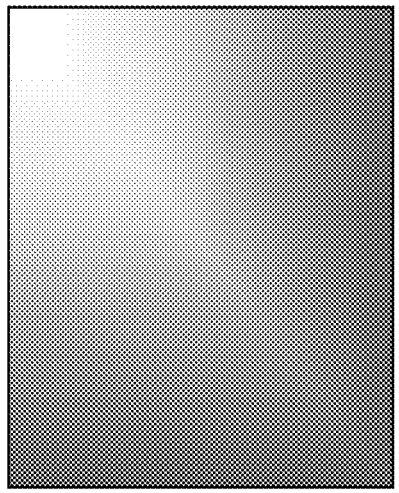
FIGS. 6C-6E are diagrams of exemplary visual representations of a metric according to the principles of the presently disclosed subject matter.
Figure 6E:
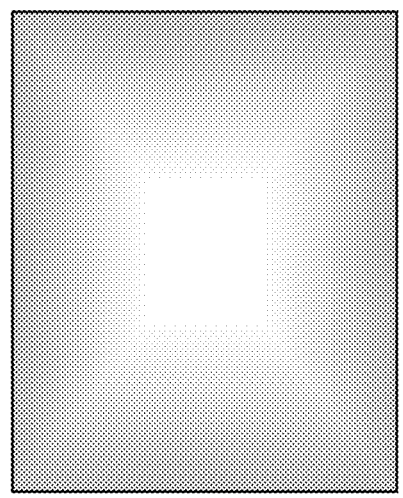
Figure 6C:
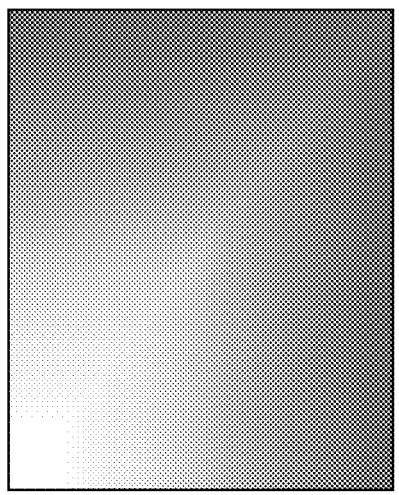

Referring now to FIGS. 6C-6E, and with continued reference to FIG. 5, FIGS. 6C-6E are diagrams of exemplary visual representations of a metric. As shown in FIGS. 6C-6E, a darker shade may represent a relatively higher value for a selected metric while a lighter shade may represent a relatively higher value for the selected metric (e.g., solid angle). For example, as shown in FIG. 6C, a first arrangement of first sensor 104*a* (e.g., camera 604*a*) and second sensor 104*b* (e.g., LiDAR 604*b*) may result in relatively low values for the metric (e.g., solid angle) at a top left of the image (e.g., corresponding to the top left of the field of view of camera 604*a*) and relatively high values for the metric at a top right and bottom left of the image (e.g., corresponding to the top right and bottom left, respectively, of the field of view of camera 604*a*). As shown in FIG. 6D, a second arrangement of first sensor 104*a* (e.g., camera 604*a*) and second sensor 104*b* (e.g., LiDAR 604*b*) may result in relatively low values for the metric (e.g., solid angle) at a top right of the image (e.g., corresponding to the top right of the field of view of camera 604*a*) and relatively high values for the metric at a top left and bottom right of the image (e.g., corresponding to the top left and bottom right, respectively, of the field of view of camera 604*a*). As shown in FIG. 6E, a third arrangement of first sensor 104*a* (e.g., camera 604*a*) and second sensor 104*b* (e.g., LiDAR 604*b*) may result in relatively low values for the metric (e.g., solid angle) at a center of the image (e.g., corresponding to the center of the field of view of camera 604*a*) and relatively higher values (but not as high as for the first and second arrangements) for the metric at the sides, top, and bottom of the image (e.g., corresponding to the sides, top, and bottom, respectively, of the field of view of camera 604*a*).

In some non-limiting embodiments or aspects, parallax estimation/sensor placement system 106 may repeat steps 502-510 for each potential arrangement of the sensors. For example, parallax estimation/sensor placement system 106 may receive potential arrangement data associated with a plurality of potential arrangements of first sensor 104*a* (e.g., camera 604*a*) and second sensor 104*b* (e.g., LiDAR 604*b*). In some non-limiting embodiments or aspects, each potential arrangement may include at least one of a respective first potential position of first sensor 104*a* (e.g., camera 604*a*), a respective first potential orientation of first sensor 104*a* (e.g., camera 604*a*), a respective second potential position of second sensor 104*b* (e.g., LiDAR 604*b*), a respective second potential orientation of second sensor 104*b* (e.g., LiDAR 604*b*), any combination thereof, and/or the like. For example, each potential position may be a potential three-dimensional position, and each potential orientation may include a potential roll and/or pitch orientation, as described herein. In some non-limiting embodiments or aspects, parallax estimation/sensor placement system 106 may repeat steps 502-510 for each potential arrangement of the potential arrangement data.

As shown in FIG. 5, at step 512, process 500 may include arranging the sensors of the autonomous vehicle based on the metric(s). For example, parallax estimation/sensor placement system 106 may automatically adjust an arrangement of first sensor 104*a* (e.g., camera 604*a*) and second sensor 104*b* (e.g., LiDAR 604*b*) based on the at least one metric (e.g., if at least one of first sensor 104*a*/camera 604*a* and/or second sensor 104*b*/LiDAR 604*b* has an adjustable mount controllable by parallax estimation/sensor placement system 106, directly or indirectly via communication with autonomous vehicle 102). Additionally or alternatively, parallax estimation/sensor placement system 106 may recommend an arrangement (e.g., selected from the potential arrangements based on the metric(s)) to a user. For example, parallax estimation/sensor placement system 106 may communicate and/or display at least one message to the user recommending the arrangement.

In some non-limiting embodiments or aspects, parallax estimation/sensor placement system 106, 606 may select and/or determine (e.g., calculate) an arrangement for first sensor 104*a* (e.g., camera 604*a*) and second sensor 104*b* (e.g., LiDAR 606*a*) based on reducing at least one metric that is (positively) correlated with parallax. For example, higher solid angles and/or higher standard deviation of solid angles may be correlated with higher parallax (and lower solid angles and/or lower standard deviations may be correlated with lower parallax). As such, parallax estimation/sensor placement system 106, 606 may select (e.g., from the plurality of potential arrangements) and/or determine (e.g., calculate) an arrangement for first sensor 104*a* (e.g., camera 604*a*) and second sensor 104*b* (e.g., LiDAR 606*a*) with a lowest average solid angle, a lowest maximum solid angle, a lowest standard deviation, a lowest average solid angle under the condition that standard deviation is below a threshold, a lowest standard deviation under the condition that the average and/or maximum solid angle is below a threshold, any combination thereof, and/or the like. (Alternatively, in situations where higher parallax is desired, parallax estimation/sensor placement system 106, 606 may select and/or determine an arrangement with the highest of the aforementioned metrics). In some non-limiting embodiments or aspects, parallax estimation/sensor placement system 106 may determine whether the field of view of first sensor 104*a* (e.g., camera 604*a*) is partially or wholly covered by the field of view of second sensor 104*b* (e.g., LiDAR 604*b*) based on the determination of which azimuth and/or elevation of first sensor 104*a* (e.g., camera 604*a*) and which azimuth and/or elevation of second sensor 104*b* (e.g., LiDAR 604*b*) is represented by each respective element in the matrix.

In some non-limiting embodiments or aspects, adjusting the arrangement may include adjusting at least one of the first position (e.g., three dimensional position) of first sensor 104*a* (e.g., camera 604*a*), the first orientation (e.g., roll and/or pitch) of first sensor 104*a* (e.g., camera 604*a*), the second position of second sensor 104*b* (e.g., LiDAR 604*b*), the second orientation of second sensor 604*b* (e.g., LiDAR 604*b*), any combination thereof, and/or the like.

In some non-limiting embodiments or aspects, parallax estimation/sensor placement system 106, 606 may communicate the metric(s) to autonomous vehicle 102, 602 (e.g., an on-board computing device thereof). Additionally or alternatively, autonomous vehicle 102, 602 may use the data from the sensors (e.g., first sensor 104a/camera 604a and/or second sensor 104b/LiDAR 604b) and/or the metrics to facilitate at least one autonomous driving operation. For example, when the sensors are arranged to reduce parallax, as described herein, autonomous vehicle 102, 602 may be more accurate in detecting an object(s) based on data from the sensors and/or controlling autonomous driving operations based thereon. Additionally or alternatively, autonomous vehicle 102, 602 may use the metric(s) (e.g., which may be associated with parallax) to generate a confidence score as to whether a first detected object from first sensor 104a/camera 604a and a second detected object from second sensor 104b/LiDAR 604b are the same object. For example, when using the metric(s) to generate confidence scores in real time during operation of autonomous vehicle 102, 602, data from the sensor(s) and/or objects detected based on the data from such sensor(s) may be weighted (e.g., by autonomous vehicle 102, 602 and/or an on-board computing device thereof) based on the metric(s) associated with parallax. For the purpose of illustration, if the metric is associated with low parallax and a resulting high confidence score, when an object detected by first sensor 104a/camera 604a to be in a slightly different location than an object detected by second sensor 104b/LiDAR 604b, then the two objects may be treated as the same object and the slight difference in position may be ignored, but if the metric is associated with high parallax and a resulting low confidence score, the two objects may be treated as separate objects.

Figure 7:
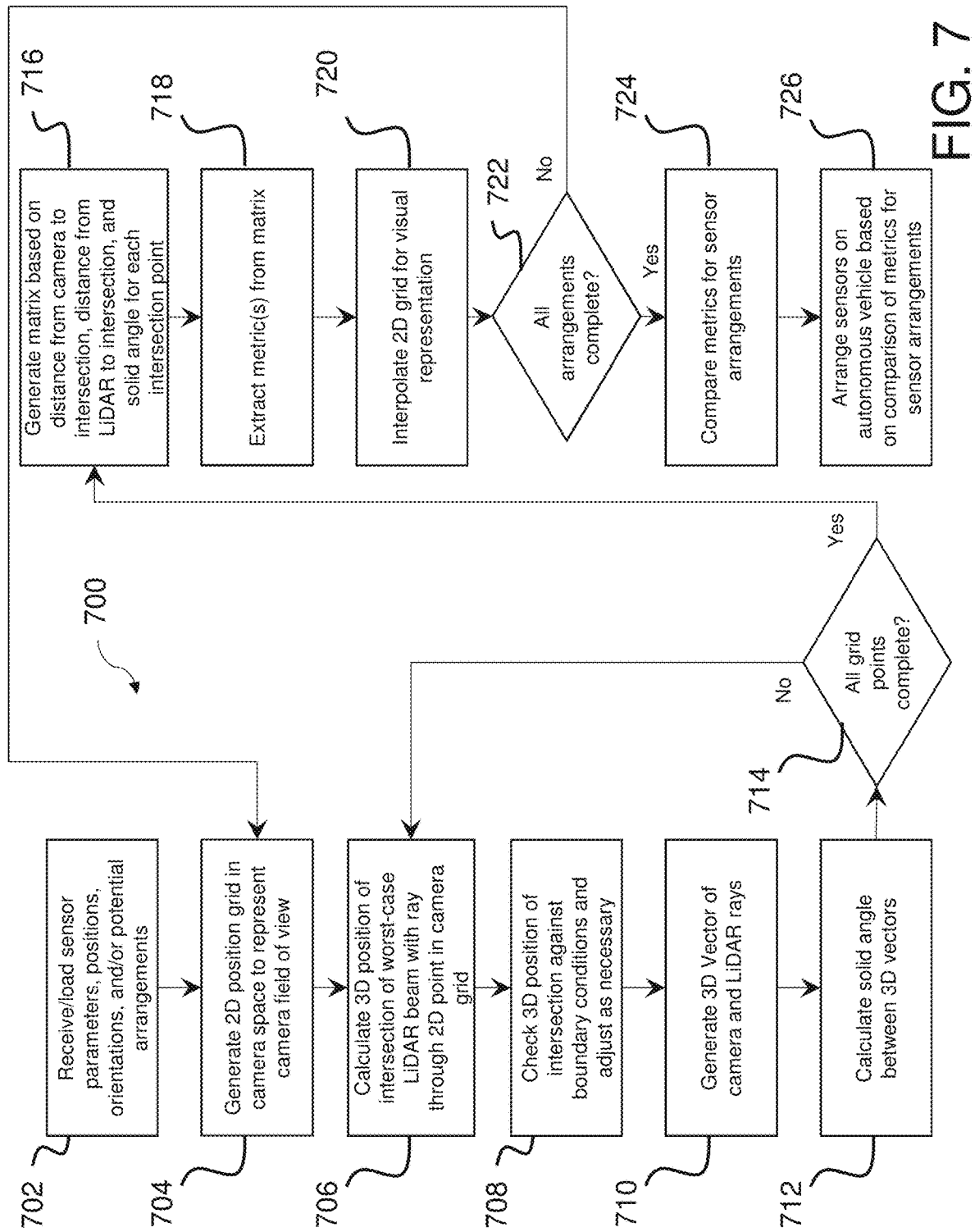
FIG. 7 is a flowchart of an exemplary implementation of a non-limiting embodiment or aspect of the process shown in FIG. 5 according to the principles of the presently disclosed subject matter.

Referring now to FIG. 7, FIG. 7 is a flowchart of an exemplary implementation 700 of a non-limiting embodiment or aspect relating to process 500 shown in FIG. 5. In some non-limiting embodiments or aspects, implementation 700 may be performed (e.g., completely, partially, and/or the like) by parallax estimation/sensor placement system 106, 606 (e.g., one or more devices of parallax estimation/sensor placement system 106, 606). In some non-limiting embodiments or aspects, implementation 700 may be performed (e.g., completely, partially, and/or the like) by another system, another device, another group of systems, or another group of devices, separate from or including parallax estimation/sensor placement system 106, 606, such as autonomous vehicle 102, 602, first sensor 104a/camera 604a, and/or second sensor 104b/LiDAR 604b.

As shown in FIG. 7, at step 702, implementation 700 may include receiving and/or loading at least one of sensor parameters for each sensor, position data for each sensor, orientation data for each sensor, and/or potential arrangement data, as described herein. For example, parallax estimation/sensor placement system 106, 606 may receive and/or load such data, as described herein.

As shown in FIG. 7, at step 704, implementation 700 may include generating a two-dimensional grid (e.g., position grid) of the field of view of first sensor 104a (e.g., camera space of camera 604a), as described herein. For example, parallax estimation/sensor placement system 106, 606 may generate a two-dimensional grid based on a field of view of camera 604a of autonomous vehicle 602, as described herein.

As shown in FIG. 7, at step 706, implementation 700 may include calculating the three-dimensional position of the intersection point between the worst-case LiDAR beam with a respective ray through the respective point in the two-dimensional grid, as described herein. For example, parallax estimation/sensor placement system 106, 606 may determine (e.g., for each respective point of the plurality of points in the grid) a three-dimensional position of a respective intersection point between a first respective ray from first sensor 104a (e.g., camera 604a) through a respective point of the plurality of points and a second respective ray from second sensor 104b (e.g., LiDAR 604b), as described herein.

As shown in FIG. 7, at step 708, implementation 700 may include checking the three-dimensional position of the intersection point against boundary conditions (and adjusting the intersection point if necessary), as described herein. For example, parallax estimation/sensor placement system 106, 606 may receive boundary data associated with at least one boundary condition and/or determine whether the intersection point does not satisfy at least one of the boundary condition(s), as described herein.

As shown in FIG. 7, at step 710, implementation 700 may include generating a three-dimensional vector for each of the rays from the first sensor/camera and the second sensor/LiDAR, as described herein. For example, parallax estimation/sensor placement system 106, 606 may generate a first three-dimensional vector based on the three-dimensional position of the respective intersection point and a first three-dimensional position of first sensor 104a (e.g., camera 604a), as described herein. Additionally or alternatively, parallax estimation/sensor placement system 106, 606 may generate a second three-dimensional vector based on the three-dimensional position of the respective intersection point and a second three-dimensional position of second sensor 104b (e.g., LiDAR 604b), as described herein.

As shown in FIG. 7, at step 712, implementation 700 may include calculating the solid angle between the respective three-dimensional vectors, as described herein. For example, parallax estimation/sensor placement system 106 may determine a respective solid angle based on the first three-dimensional vector from first sensor 104a/camera 604a (or a first unit vector generated based thereon) and the second three-dimensional vector from second sensor 104b/LiDAR 604b (or a second unit vector generated based thereon), as described herein.

As shown in FIG. 7, at step 714, implementation 700 may include determining whether processing of all points in the two-dimensional grid is complete, as described herein. For example, parallax estimation/sensor placement system 106, 606 may determine that such processing is not yet complete and repeat steps 706-712 (e.g., for each point in the grid), as described herein. Once processing of each point in the grid is complete, implementation 700 may continue to step 716.

As shown in FIG. 7, at step 716, implementation 700 may include generating a matrix based on the distance from the first sensor/camera to the respective intersection point, the distance from the second sensor/LiDAR to the respective intersection point, and the solid angle for each respective intersection point, as described herein. For example, parallax estimation/sensor placement system 106, 606 may generate the matrix, as described herein.

As shown in FIG. 7, at step 718, implementation 700 may include extracting at least one metric from the matrix, as described herein. For example, parallax estimation/sensor placement system 106, 606 may extract at least one metric from the matrix, as described herein.

As shown in FIG. 7, at step 720, implementation 700 may include interpolating the two-dimensional grid for visual representation, as described herein. For example, parallax estimation/sensor placement system 106, 606 may interpolate the two-dimensional grid based on the metric(s) extracted from the matrix to render and/or display a visual representation of the metric(s), as described herein.

As shown in FIG. 7, at step 722, implementation 700 may include determining whether processing of all potential arrangements of the sensors is complete, as described herein. For example, parallax estimation/sensor placement system 106 may determine that such processing is not yet complete and repeat steps 704-720 (e.g., for each potential arrangement), as described herein. Once processing of each potential arrangement is complete, implementation 700 may continue to step 724.

As shown in FIG. 7, at step 724, implementation 700 may include comparing the metric(s) for each potential sensor arrangement, as described herein. For example, parallax estimation/sensor placement system 106, 606 may determine if one of the potential sensor arrangements reduces parallax (or, if desired, increases parallax) with respect to the other arrangement(s) based on the metric(s) (e.g., lower metric(s) may be correlated with lower parallax and higher metrics may be correlated with higher parallax), as described herein.

As shown in FIG. 7, at step 726, implementation 700 may include arranging the sensors on the autonomous vehicle, as described herein, such as based on a comparison of metrics for sensor arrangements. For example, first sensor 104a (e.g., camera 604a) and second sensor 104b (e.g., LiDAR 604b) may be arranged on autonomous vehicle 102, 602, as described herein. In some non-limiting embodiments or aspects, the data from the sensors (e.g., as so arranged) may be used to facilitate at least one autonomous driving operation, as described herein. Additionally or alternatively, the metric(s) determined based on the arrangement of the sensors may be used to facilitate at least one autonomous driving operation, as described herein.

Although the disclosed subject matter has been described in detail for the purpose of illustration based on what are currently considered to be the most practical and preferred embodiments or aspects, it is to be understood that such detail is solely for that purpose and that the disclosed subject matter is not limited to the disclosed embodiments or aspects, but, on the contrary, is intended to cover modifications and equivalent arrangements that are within the spirit and scope of the appended claims. For example, it is to be understood that the presently disclosed subject matter contemplates that, to the extent possible, one or more features of any embodiment or aspect can be combined with one or more features of any other embodiment or aspect.

What is claimed is:

1. A method for parallax estimation for sensors for autonomous vehicles performed by a parallax estimation and sensor placement system, comprising:
    generating a two-dimensional grid based on a field of view of a first sensor of an autonomous vehicle, the grid comprising a plurality of points;
    for each respective point of the plurality of points, determining a three-dimensional position of a respective intersection point between a first respective ray from the first sensor to the respective point of the plurality of points and a second respective ray from a second sensor of the autonomous vehicle, wherein a plurality of intersection points comprises each respective intersection point for each respective point of the plurality of points;
    for each respective intersection point of the plurality of intersection points, determining a respective solid angle based on a first three-dimensional vector from the first sensor to the three-dimensional position of the respective intersection point and a second three-dimensional vector from the second sensor to the three-dimensional position of the respective intersection point;
    generating a matrix based on a first distance from the first sensor to each respective intersection point, a second distance from the second sensor to each respective intersection point, and the solid angle for each respective intersection point;
    extracting at least one metric from the matrix;
    adjusting an arrangement of the first sensor and the second sensor based on the at least one metric; interpolating the two-dimensional grid based on the at least one metric; and
    displaying a visual representation based on interpolating the two-dimensional grid, wherein displaying the visual representation comprises displaying a gradient of at least one of shades or colors based on the at least one metric across a two-dimensional image.

2. The method of claim 1, wherein the first sensor comprises an image capture system and the second sensor comprises a ray casting system.

3. The method of claim 2, wherein the image capture system comprises a camera and the ray casting system comprises a LiDAR.

4. The method of claim 1, further comprising receiving first sensor parameters for the first sensor, first position data associated with a first position of the first sensor, first orientation data associated with a first orientation of the first sensor, second sensor parameters for the second sensor, second position data associated with a second position of the second sensor, and second orientation data associated with a second orientation of the second sensor,
    wherein the first sensor parameters comprise the field of view of the first sensor,
    wherein the second sensor parameters comprise ray data associated with a plurality of rays cast by the second sensor, and
    wherein adjusting the arrangement comprises adjusting at least one of the first position of the first sensor, the first orientation of the first sensor, the second position of the second sensor, the second orientation of the second sensor, or any combination thereof.

5. The method of claim 1, wherein generating the two-dimensional grid comprises:
    generating a plurality of horizontal lines across the field of view; and
    generating a plurality of vertical lines across the field of view,
    wherein each respective intersection between a respective horizontal line of the plurality of horizontal lines and a respective vertical line of the plurality of vertical lines comprises a respective point of the plurality of points.

6. The method of claim 1, further comprising determining the first respective ray from the first sensor to each respective point of the plurality of points based on an azimuth and an elevation for each respective point with respect to the first sensor.

7. The method of claim 6, wherein the first sensor comprises a camera and the azimuth and the elevation for each respective point are with respect to a center of a lens of the camera.

8. The method of claim 1, wherein the second respective ray comprises a worst-case ray of a plurality of rays cast by the second sensor.

9. The method of claim 8, wherein the second sensor comprises a LiDAR, and wherein the worst-case ray comprises a lowest beam having a lowest elevation if the LiDAR is positioned above the first sensor or a highest beam having a highest elevation if the LiDAR is positioned below the first sensor.

10. The method of claim 9, further comprising:
receiving boundary data associated with at least one boundary condition;
determining that a first intersection point of the plurality of intersection points does not satisfy the at least one boundary condition; and
replacing the first intersection point with a replacement intersection point between the first respective ray from the first sensor and a lowest remaining beam having a lowest remaining elevation if the LiDAR is positioned above the first sensor or a highest remaining beam having a highest remaining elevation if the LiDAR is positioned below the first sensor, wherein the replacement intersection point does satisfy the at least one boundary condition.

11. The method of claim 10, wherein the at least one boundary condition comprises at least one of a first minimum range for the first sensor, a second minimum range for the second sensor, a first maximum range for the first sensor, a second maximum range for the second sensor, a ground surface position of a ground surface upon which the autonomous vehicle is located, or any combination thereof.

12. The method of claim 1, further comprising:
generating the first three-dimensional vector based on the three-dimensional position of the respective intersection point and a first three-dimensional position of the first sensor; and
generating the second three-dimensional vector based on the three-dimensional position of the respective intersection point and a second three-dimensional position of the second sensor.

13. The method of claim 1, wherein determining the respective solid angle comprises:
generating a first unit vector based on the first three-dimensional vector;
generating a second unit vector based on the second three-dimensional vector; and
calculating the solid angle based on the first unit vector and the second unit vector.

14. The method of claim 1, wherein generating the matrix comprises:
generating a 3×n matrix, wherein n is a number of intersection points of the plurality of intersection points; and
populating each respective column of the 3×n matrix with the first distance from the first sensor to the respective intersection point, the second distance from the second sensor to the respective intersection point, and the solid angle for the respective intersection point.

15. The method of claim 1, wherein extracting the at least one metric from the matrix comprises at least one of:
determining a minimum solid angle based on the matrix;
determining a maximum solid angle based on the matrix;
determining a minimum range of solid angles based on the matrix;
determining a maximum range of solid angles based on the matrix;
determining a spread of solid angles based on the matrix;
determining an average of solid angles based on the matrix;
determining a standard deviation of solid angles based on the matrix;
determining a three-sigma range of solid angles based on the matrix;
determining a minimum first distance based on the matrix;
determining a maximum first distance based on the matrix;
determining a minimum range of first distances based on the matrix;
determining a maximum range of first distances based on the matrix;
determining a spread of first distances based on the matrix;
determining an average of first distances based on the matrix;
determining a standard deviation of first distances based on the matrix;
determining a three-sigma range of first distances based on the matrix;
determining a minimum second distance based on the matrix;
determining a maximum second distance based on the matrix;
determining a minimum range of second distances based on the matrix;
determining a maximum range of second distances based on the matrix;
determining a spread of second distances based on the matrix;
determining an average of second distances based on the matrix;
determining a standard deviation of second distances based on the matrix;
determining a three-sigma range of second distances based on the matrix; or
any combination thereof.

16. The method of claim 1, further comprising:
receiving potential arrangement data associated with a plurality of potential arrangements of the first sensor and the second sensor, the plurality of potential arrangements comprising a first potential arrangement and a second potential arrangement,
wherein the first sensor and the second sensor are initially in the first potential arrangement, and
wherein adjusting the arrangement comprises:
adjusting the arrangement from the first potential arrangement to the second potential arrangement based on the at least one metric satisfying a threshold; and
repeating generating of the two-dimensional grid, determining of the three-dimensional position of the respective intersection point for each respective point of the plurality of points, determining the respective solid angle for each respective intersection point, generating the matrix, and extracting the at least one metric from the matrix based on the first sensor and the second sensor being in the second potential arrangement.

17. A system for parallax estimation for sensors for autonomous vehicles, comprising:
an autonomous vehicle;
a first sensor of the autonomous vehicle;
a second sensor of the autonomous vehicle; and
a parallax estimation and sensor placement system configured to:
generate a two-dimensional grid based on a field of view of the first sensor of the autonomous vehicle, the grid comprising a plurality of points;
for each respective point of the plurality of points, determine a three-dimensional position of a respective intersection point between a first respective ray from the first sensor to the respective point of the plurality of points and a second respective ray from the second sensor of the autonomous vehicle, wherein a plurality of intersection points comprises each respective intersection point for each respective point of the plurality of points;

for each respective intersection point of the plurality of intersection points, determine a respective solid angle based on a first three-dimensional vector from the first sensor to the three-dimensional position of the respective intersection point and a second three-dimensional vector from the second sensor to the three-dimensional position of the respective intersection point;

generate a matrix based on a first distance from the first sensor to each respective intersection point, a second distance from the second sensor to each respective intersection point, and the solid angle for each respective intersection point; and extract at least one metric from the matrix; interpolate the two-dimensional grid based on the at least one metric; and display a visual representation based on interpolating the two-dimensional grid, wherein the visual representation comprises a gradient of at least one of shades or colors based on the at least one metric across a two-dimensional image, wherein an arrangement of the first sensor and the second sensor is adjusted based on the at least one metric.

18. A computer program product for parallax estimation for a first sensor and a second sensor of an autonomous vehicle, the computer program product comprising at least one non-transitory computer-readable medium comprising one or more instructions that, when executed by at least one processor, cause the at least one processor to:

generate a two-dimensional grid based on a field of view of the first sensor of the autonomous vehicle, the grid comprising a plurality of points;

for each respective point of the plurality of points, determine a three-dimensional position of a respective intersection point between a first respective ray from the first sensor to the respective point of the plurality of points and a second respective ray from the second sensor of the autonomous vehicle, wherein a plurality of intersection points comprises each respective intersection point for each respective point of the plurality of points;

for each respective intersection point of the plurality of intersection points, determine a respective solid angle based on a first three-dimensional vector from the first sensor to the three-dimensional position of the respective intersection point and a second three-dimensional vector from the second sensor to the three-dimensional position of the respective intersection point;

generate a matrix based on a first distance from the first sensor to each respective intersection point, a second distance from the second sensor to each respective intersection point, and the solid angle for each respective intersection point; and extract at least one metric from the matrix; interpolate the two-dimensional grid based on the at least one metric; and display a visual representation based on interpolating the two-dimensional grid, wherein the visual representation comprises a gradient of at least one of shades or colors based on the at least one metric across a two-dimensional image, wherein an arrangement of the first sensor and the second sensor is adjusted based on the at least one metric.

* * * * *